US009832680B2

(12) United States Patent
Huang et al.

(10) Patent No.: US 9,832,680 B2
(45) Date of Patent: Nov. 28, 2017

(54) DYNAMIC INDICATION MAP FOR MULTICAST GROUP AND TRAFFIC INDICATION

(71) Applicant: Intel IP Corporation, Santa Clara, CA (US)

(72) Inventors: Po-Kai Huang, Santa Clara, CA (US); Emily H. Qi, Camas, WA (US); Minyoung Park, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 63 days.

(21) Appl. No.: 14/752,324

(22) Filed: Jun. 26, 2015

(65) Prior Publication Data

US 2016/0269930 A1 Sep. 15, 2016

Related U.S. Application Data

(60) Provisional application No. 62/132,074, filed on Mar. 12, 2015.

(51) Int. Cl.
*H04W 28/02* (2009.01)
*H04W 4/02* (2009.01)
(Continued)

(52) U.S. Cl.
CPC ......... *H04W 28/0289* (2013.01); *H04L 47/12* (2013.01); *H04W 4/02* (2013.01);
(Continued)

(58) Field of Classification Search
CPC ..... H04W 28/0289; H04W 4/02; H04W 4/06; H04W 8/26
(Continued)

(56) References Cited

U.S. PATENT DOCUMENTS

2007/0268868 A1 11/2007 Singh et al.
2013/0288668 A1 10/2013 Pragada et al.
(Continued)

FOREIGN PATENT DOCUMENTS

WO 2014074681 5/2014

OTHER PUBLICATIONS

International Search Report and Written Opinion from PCT Application No. PCT/US2016/017669 mailed Jun. 13, 2016. (24 pgs.).
(Continued)

*Primary Examiner* — Ronald B Abelson
(74) *Attorney, Agent, or Firm* — Eversheds Sutherland (US) LLP

(57) ABSTRACT

This disclosure describes methods, apparatus, and systems related to: identifying, at a first wireless communication station, one or more second wireless communication stations within a predetermined proximity of the first wireless communication station; determining, at the first wireless communication station, one or more second wireless communication stations identified within the predetermined proximity of the first wireless communication station for which a multicast frame is intended; generating, at the first wireless communication station, a bit map comprising a hashed identifier of each of the one or more second wireless communication stations for which the multicast frame is intended, wherein the bit map is included in the multicast frame; and causing to transmit, by the first wireless communication station, the multicast frame from the first wireless communication station to the one or more second wireless communication stations for which the multicast frame is intended.

20 Claims, 9 Drawing Sheets

(51) Int. Cl.
  *H04W 4/06* (2009.01)
  *H04W 8/26* (2009.01)
  *H04L 12/801* (2013.01)
  *H04W 8/00* (2009.01)
  *H04W 88/08* (2009.01)
  *H04W 84/12* (2009.01)

(52) U.S. Cl.
  CPC ............ *H04W 4/06* (2013.01); *H04W 8/005* (2013.01); *H04W 8/26* (2013.01); *H04W 84/12* (2013.01); *H04W 88/08* (2013.01)

(58) Field of Classification Search
  USPC ........................................................ 370/230
  See application file for complete search history.

(56) References Cited

U.S. PATENT DOCUMENTS

2014/0036912 A1  2/2014  Hui et al.
2014/0126453 A1  5/2014  Park et al.

OTHER PUBLICATIONS

Wikipedia, "Bloom Filter," https://en.wikipedia.org/wiki/Bloom_filter, Jun. 20, 2016, 13 pages.

DYNAMIC INDICATION MAP FOR MULTICAST GROUP AND TRAFFIC INDICATION

CROSS REFERENCE TO RELATED APPLICATIONS

This U.S. Non-Provisional patent application claims priority to U.S. Provisional Patent Application No. 62/132,074 filed on Mar. 12, 2015 and entitled "DYNAMIC INDICATION MAP FOR MULTICAST GROUP AND TRAFFIC INDICATION," the entire contents of which are hereby incorporated by reference for all purposes.

TECHNICAL FIELD

This disclosure generally relates to systems and methods for wireless communications and, more particularly, to utilizing a dynamic indication map for multicast group and traffic indication.

BACKGROUND

In a wireless communication network, various devices, such as access points and wireless stations, may wish to communicate with each other. In some embodiments, an access point may facilitate the transmission of data between the access point and wireless stations. For example, the access point may establish a traffic indication map (TIM) or a multicast group of wireless stations for enabling communication with each wireless station.

However, this type of wireless communication network does not enable wireless stations to communicate directly with other nearby wireless stations. Instead, a wireless station must transmit data to the access point, which then relays the data to a second wireless station. As such, this method of wireless communication may be inefficient, particularly if a wireless station wishes to communicate data to a large number of other wireless stations.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
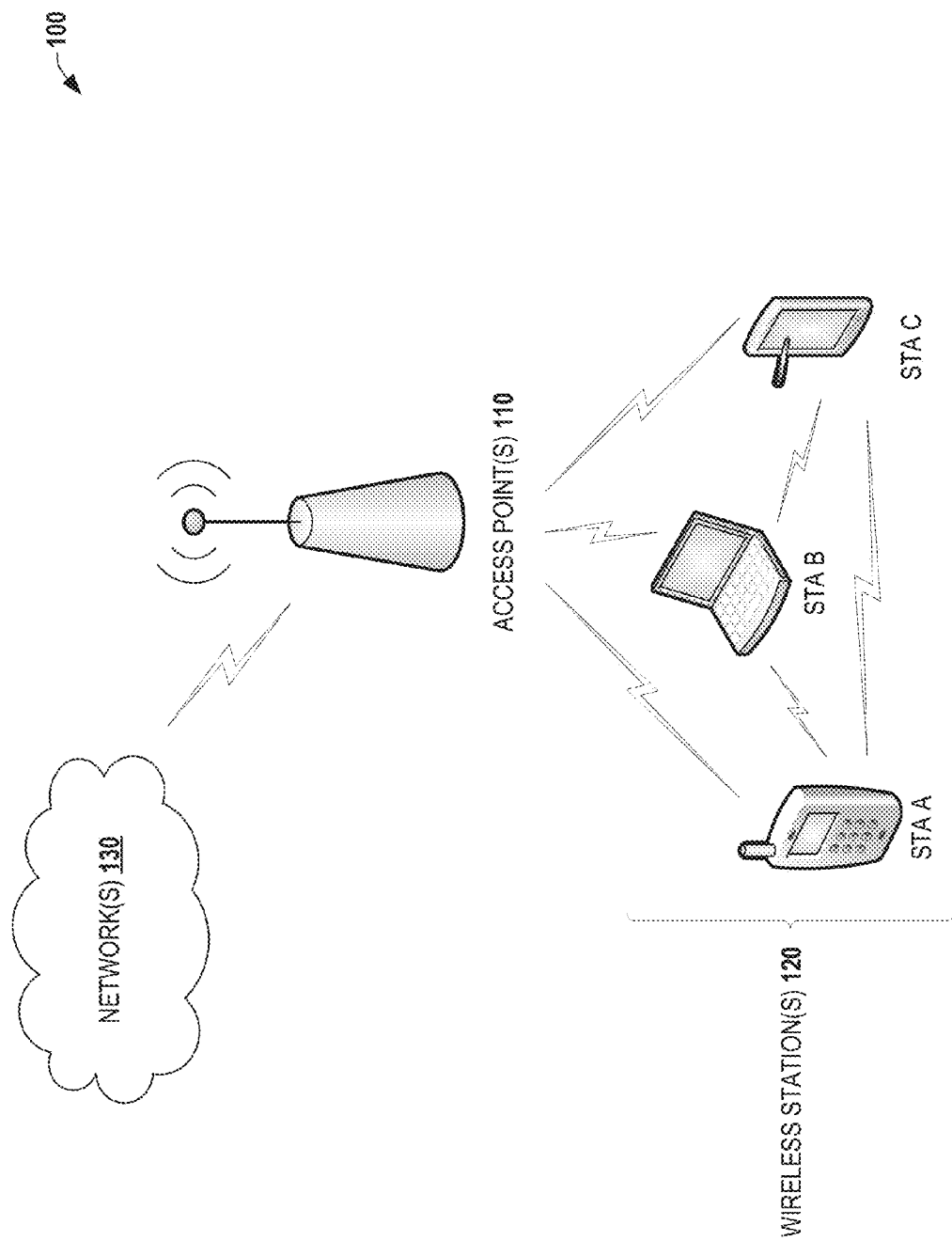
FIG. 1 depicts a network diagram illustrating an example network environment of an illustrative wireless communication system, according to one or more example embodiments of the disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Example embodiments described herein provide certain systems, methods, and devices, for providing signaling information to Wi-Fi devices in various Wi-Fi networks. As such, Wi-Fi-enabled devices in various Wi-Fi networks, including, but not limited to, IEEE 802.11ax, may utilize embodiments described herein.

More particularly, embodiments disclosed herein are directed to Wi-Fi-enabled devices, and may enable a plurality of wireless stations to efficient communicate peer-to-peer with one another in a many-to-many or many-to-one framework without the assistance of an access point. This may be achieved by forming a cluster of devices within proximity of one another that follow the same timing schedule so that the stations can share cluster information during a discovery window. The cluster information may include a dynamically generated bit map that avoid what might otherwise be an overhead intensive exchange of data to indicate traffic or multicast formation among the stations in the cluster. The bit map may be transmitted by one station in the group to the other stations in the group, and the bit map will indicate which devices have traffic or are in the multicast group.

For example, a first wireless station may determine that there are two other wireless stations nearby (e.g., within a predetermined distance of the first wireless station). Once discovered, the two nearby wireless stations may, using bit mapping techniques described herein, synchronize with one another and the first wireless station to form a cluster of wireless stations. For example, clustered wireless stations may synchronize their discovery windows (e.g., a predetermined window of time during which a wireless station is configured to discover and/or recognize other wireless stations for cluster formation, synchronization, communication of information, and/or the like) to a common time schedule shared by all (or at least a portion) of the clustered wireless stations.

In this manner, embodiments disclosed herein may serve to facilitate cluster formation of one or more nearby wireless stations (e.g., wireless stations within a predetermined proximity of each other) so that each wireless station is aware of when nearby wireless stations may be communicating, transmitting, and/or receiving information, discovering and/or or clustering with other wireless stations, and/or the like. Further, synchronizing the discovery windows of each wireless station in accordance with embodiments disclosed herein provides a solution for achieving low power discovery operation of one or more wireless stations within a predetermined proximity of each other.

After discovery operations are complete and a cluster of one or more wireless stations is formed, the one or more wireless stations are then enabled to communicate directly with one another in the formed cluster using peer-to-peer data transmissions. As such, the one or more wireless stations may communicate with one another without utilizing infrastructure such as an access point. This facilitation of "many-to-many" data transmission (e.g., many wireless stations of a cluster communicating directly with other wireless stations of the same cluster) without infrastructure support (e.g., without utilizing an access point) may be a feature of embodiments disclosed herein.

Referring now to the drawings, FIG. 1 illustrates a wireless communication system 100 in accordance with one or more embodiments of the disclosure. For example, the wireless communication system 100 may comprise one or more access points 110 and/or one or more wireless stations 120. Typically, the one or more access points 110 communicate with the one or more wireless stations 120 to obtain access to the one or more networks 130. The one or more access points 110 may be operable by and/or associated with one or more service providers such as a cable company, a fiber company, a wireless network provider, an Internet provider, a Wi-Fi hotspot operator, a home owner, a network administrator, and/or the like. Typically, the one or more access points 110 provide access to the Internet or other wireless network, and/or the like via network (s) 130. The one or more access points 110 may include any suitable processor-driven device including, but not limited to, a mainframe server, a hard drive, a desktop computing device, a laptop computing device, a router, a repeater, a switch, a smartphone, a tablet, a wearable wireless device (e.g., a bracelet, a watch, glasses, a ring, an implant, and/or the like) and/or so forth. For example, the one or more access points 110 may embody computing device 710 of FIG. 7, computing device 910 of FIG. 9, computing device 1000 of FIG. 10, and/or the like. The term "access point" (AP) (e.g., access point(s) 110) as used herein may be a fixed station. An access point 110 may also be referred to as an access node, a base station or some other similar terminology known in the art. An access point 110 may also be called a mobile station, user equipment (UE), a wireless communication device or some other similar terminology known in the art.

However, in some embodiments, the wireless stations 120 may not communicate with the access point 110, but instead directly communicate with one another. Accordingly, the wireless stations 120 may not utilize an access point 110 to communicate with other wireless stations 120 and may instead communicate directly with other wireless stations 120. To facilitate direct communication between wireless devices 120, a dynamic bit map may be utilized as described in detail herein. The one or more wireless stations 120 (STAs) may be operable by one or more respective users (e.g., subscribers, viewers, customers, consumers, operators, administrators, agents, and/or the like) of the one or more wireless stations.

The wireless station(s) 120 may include any suitable processor-driven user device including, but not limited to, a desktop computing device, a laptop computing device, a server, a router, a switch, a smartphone, a tablet, wearable wireless device (e.g., bracelet, watch, glasses, ring, implant, etc.) and so forth. For example, the one or more wireless stations 120 may embody computing device 710 of FIG. 7, computing device 910 of FIG. 9, computing device 1000 of FIG. 10, and/or the like. Alternatively, the one or more wireless stations 120 may be routers, repeaters, and/or any other type of networking hardware.

Wireless station(s) 120 may be configured to communicate with each other and any other component of the wireless communication system 100 via direct communication or one or more communications networks (e.g., networks 130). Any of the communications networks 130 may include, but are not limited to any one or a combination of different types of suitable communications networks such as, for example, broadcasting networks, cable networks, public networks (e.g., the Internet), private networks, wireless networks, cellular networks, or any other suitable private and/or public networks. Further, any of the communications networks 130 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit (e.g., an access point 110), which is capable of communicating a wireless communication signal, may include a wireless transmitter to transmit the wireless communication signal to at least one other wireless communication unit (e.g., a wireless station 120), and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Orthogonal Frequency-Division Multiple Access (OFDMA), Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Further, any of the one or more access points 110 and/or the one or more wireless stations 120 may include one or more communications antennae. Communications antenna may be any suitable type of antenna corresponding to the communications protocols used by the one or more access points 110 and/or the one or more wireless stations 120. Some non-limiting examples of suitable communications antennas include WiFi antennas, IEEE 802.11 family of standards compatible antennas, directional antennas, non-directional antennas, dipole antennas, folded dipole antennas, patch antennas, MIMO antennas, or the like. The communications antenna may be communicatively coupled to a radio component to transmit and/or receive signals, such as communications signals to and/or from the one or more access points 110 and/or the one or more wireless stations 120. Any of the one or more access points 110 and/or the one or more wireless stations 120 may include any suitable radio and/or transceiver for transmitting and/or receiving radio frequency (RF) signals in the bandwidth and/or channels corresponding to the communications protocols utilized by any of the one or more access points 110 and/or the one or more wireless stations 120 to communicate with each other. Particularly, radios and/or transceivers may be utilized to facilitate direct communication between wireless stations 120 as described herein. The radio components may include hardware and/or software to modulate and/or demodulate communications signals according to pre-established transmission protocols. The radio components may further have hardware and/or software instructions to communicate via one or more WiFi and/or WiFi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad) or any other 802.11 type channels (e.g., 802.11ax). In some embodiments, non-WiFi protocols may be used for communications between devices, such as Bluetooth, dedicated short-range communication (DSRC), Ultra-High Frequency (UHF), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In some instances, a transmitter, such as a transmitting wireless device 120, may transmit a trigger frame (e.g., a dynamic bit map as described herein, a data packet, a training field, a channel training symbol, and/or the like) to one or more other wireless stations 120. The trigger frame may be sent periodically and/or continuously and may include scheduling information for frequency, subband, and/or spatial stream designations for respective wireless stations 120 in communication with other wireless stations 120. In some embodiments, each wireless station 120 may be designated a particular frequency and/or subband for communication with one or more wireless stations 120. Alternatively, each wireless station 120 may be designated a frequency and/or subband that is dynamic and therefore may change depending on particular conditions (e.g., current traffic, measured distortion, predicted traffic, and/or the like). The one or more wireless stations 120 may use information provided in the trigger frame (or in a header of the trigger frame) to synchronize with one or more wireless devices as described herein. Communication between wireless stations 120 typically occurs over one or more channels (e.g., streams of data).

Figure 2:
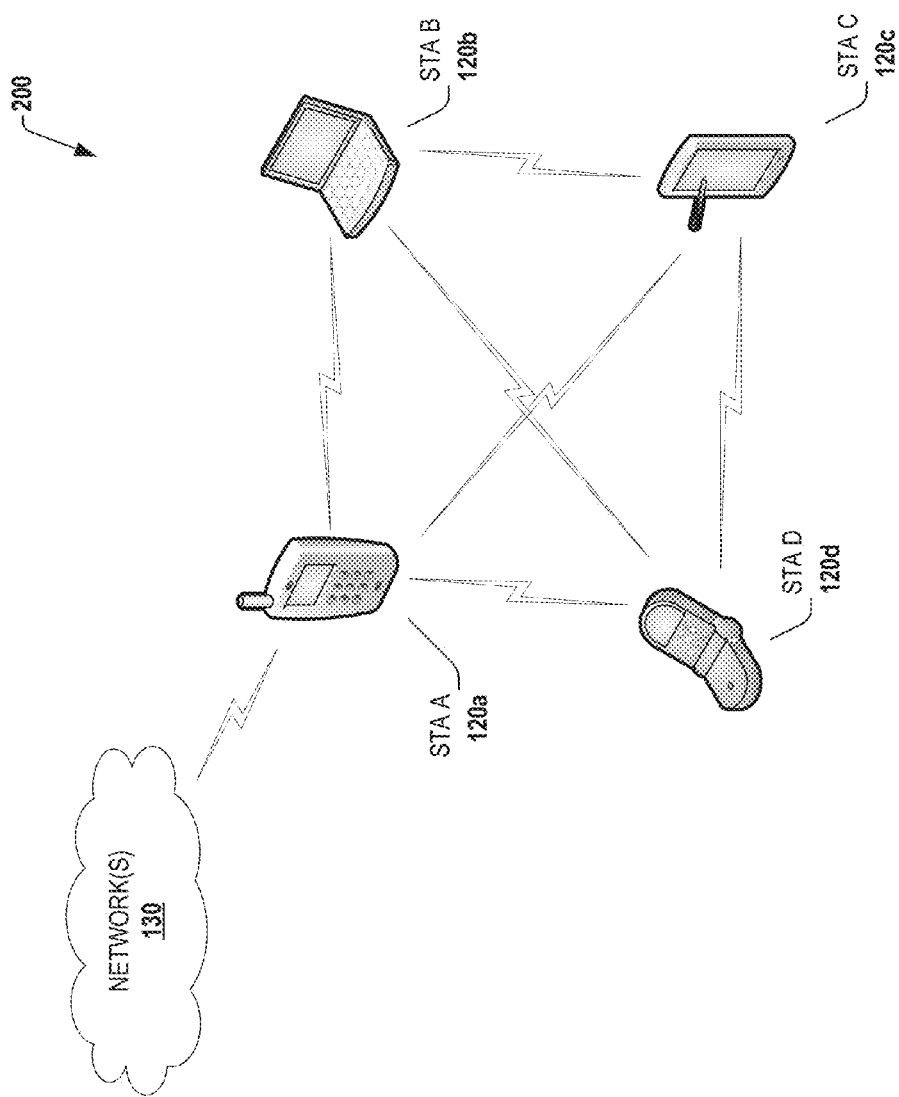
FIG. 2 depicts an example wireless communication system, according to one or more example embodiments of the disclosure.

For example, FIG. 2 depicts an exemplary system environment 200 where wireless stations 120 STA A 120a, STA B 120b, STA C 120c, and STA D 120d may communicate directly with each other by a "many-to-many" data transmission framework without utilizing an access point. Unlike a traditional infrastructure system facilitating "many-to-one" or "one-to-many" data transmission frameworks, where data traffic (e.g., transmission of information, allocation information, and/or the like) of a wireless station 120 is routed through and/or controlled by a central access point, each wireless station 120 in a clustered group of wireless stations 120 (e.g., a "many-to-many" data transmission framework) may receive from and/or transmit traffic to any other wireless stations 120 in the clustered group without utilizing an access point 110. Hence, several traditional data transmission schemes devoted primarily for utilization by "many-to-one" and/or "one-to-many" data transmission frameworks (e.g., frameworks where an access point routes and/or controls communication between the wireless stations), such as traffic indication mapping (TIM) and/or multicast grouping, may not work efficiently.

According to embodiments of the disclosure described herein, wireless stations 120 may communicate directly with other wireless stations 120 in a common cluster (such as depicted in FIG. 2), and therefore no centralized access point may be in direct communication with the wireless station(s)

120. Thus, in order for each wireless station 120 to communicate directly with other wireless stations 120 in a common cluster, in accordance with embodiments, each wireless station 120 may utilize a list of station identifiers, such as the media access control (MAC) addresses, of each wireless station 120 to indicate which particular wireless station 120 is intended to receive and/or process a multicast frame (e.g., data, a data packet, traffic, and/or the like). In accordance with embodiments described herein, MAC addresses of the wireless stations 120 for which a multicast frame is intended to be received and/or processed (e.g., the destination wireless stations 120) may be encoded into a bit map, which may be transmitted to each wireless station 120 in a cluster prior to and/or currently with transmission of the multicast frame. Upon receipt of the bit map, each wireless device 120 may decode the bit map to determine whether the multicast frame is intended for receipt and/or processing by each respective wireless device 120. For example, if a first wireless device decodes the bit map and determines that the MAC address associated with the first wireless device is included in and/or indicated by the bit map, then the first wireless device may receive and/or process the multicast frame. Alternatively, if a second wireless device decodes the bit map and determines that the MAC address associated with the second wireless device is not included in and/or indicated by the bit map, then the second wireless device may not receive and/or process the multicast frame.

In some embodiments, the MAC addresses associated with each clustered wireless station 120 may be shared between (e.g., transmitted to and/or received from) clustered wireless stations 120. For example, if STA A 120a (e.g., a transmitting wireless station 120) is aware of the MAC address associated with each receiving wireless station 120 in a cluster (e.g., STA B 120b, STA C 120c, and STA D 120d), then STA A 120a may transmit the MAC address of each receiving wireless station 120 to all of STA B 120b, STA C 120c, and STA D 120d. In this manner, each wireless station 120 may determine and/or identify each of the other wireless stations 120 that are nearby and/or included in a cluster. Therefore, each wireless station 120 in a cluster may be enabled to send a transmission to each (or all) wireless station 120 included in the cluster because the MAC address of each clustered wireless station 120 is known.

Accordingly, these known MAC addresses may be used by a transmitting wireless station 120 to indicate which other wireless stations 120 in the cluster are intended to receive and/or process a multicast frame. For example, the MAC addresses of other wireless stations 120 may be included in the multicast frame, in a portion of a multicast frame header, in a trigger frame and, in accordance with embodiments disclosed herein, a bit map, and/or the like to indicate that the other wireless stations 120 are intended to receive and/or process the multicast frame. Accordingly, the MAC addresses of wireless stations 120 for which the multicast frame is not intended may not be included or indicated in the multicast frame (or bit map, and/or the like).

In accordance with embodiments disclosed herein, a dynamic bit map may be included in the multicast frame, transmitted prior to and/or concurrently with the multicast frame, and/or the like. However, due to the length of a MAC address, each MAC address may require a transmission to include a large number of bits (e.g., approximately 48 bits for each MAC address), and therefore identifying and/or facilitating direct communication between wireless stations 120 may create a huge overhead. Specifically, a large number of bits in the multicast frame and/or an associated bit map may be utilized to include a plurality of MAC addresses associated with each MAC address of each wireless device 120 for which the multicast frame is intended to be included in a multicast frame and/or associated bit map, trigger frame, and/or the like. As such, overhead (e.g., a number of bits required to be included in the multicast frame and/or bit map) and/or size of the multicast frame and/or the bit map may increase dramatically as the number of receiving wireless devices 120 increases.

To eliminate such need for large amounts of data transmission and/or message exchange between wireless stations 120 when forming clusters, in accordance with embodiments, hash functions may be applied to the MAC addresses to generate dynamic bit maps that require significantly fewer bits. These dynamic bit maps may be transmitted prior to and/or concurrently with the multicast frame and may include the hashed MAC addresses of wireless devices 120 for which the multicast frame is intended.

For example, consider a bit map (e.g., bit map 310 of the bit map encoding process 300 of FIG. 3) with M bits. One or more (H) hash functions 320 (e.g., hash functions 320a, 320b, 320c) may be used to map an identity (e.g., a MAC address) of a wireless station 120 to certain locations (e.g., bit locations in the dynamic bit map identified by the application of each hash function to the MAC address) of a bit map. For example, a MAC address 330 of a wireless station 120 may be inputted into one or more hash functions (e.g., hash functions 320), which then process the MAC address and output a processed MAC address to set one or more bits in the bit map 300, such as bits B1, B4 and B7, to "1." In some embodiments, the certain location of a wireless station 120 identity may include one bit in the bit map, or may include a plurality of bits in the bit map. Further, one hash function may be used to map each wireless station 120 identity to a particular location of the bit map, or a plurality of hash functions may be used to map each wireless station identity 330 to one or more particular locations (e.g., bits) of the bit map 310. For example, hash functions 320a, 320b, and 320c may be different hash functions, or they may be the same hash function. The hash functions may be predetermined and/or agreed upon by operators of the one or more wireless stations 120. By hashing and mapping a wireless station identity 330 to bits of the bit map 310, a much smaller number of bits may be required to be included in the bit map when compared to traditional communication methods described herein.

Figure 3:
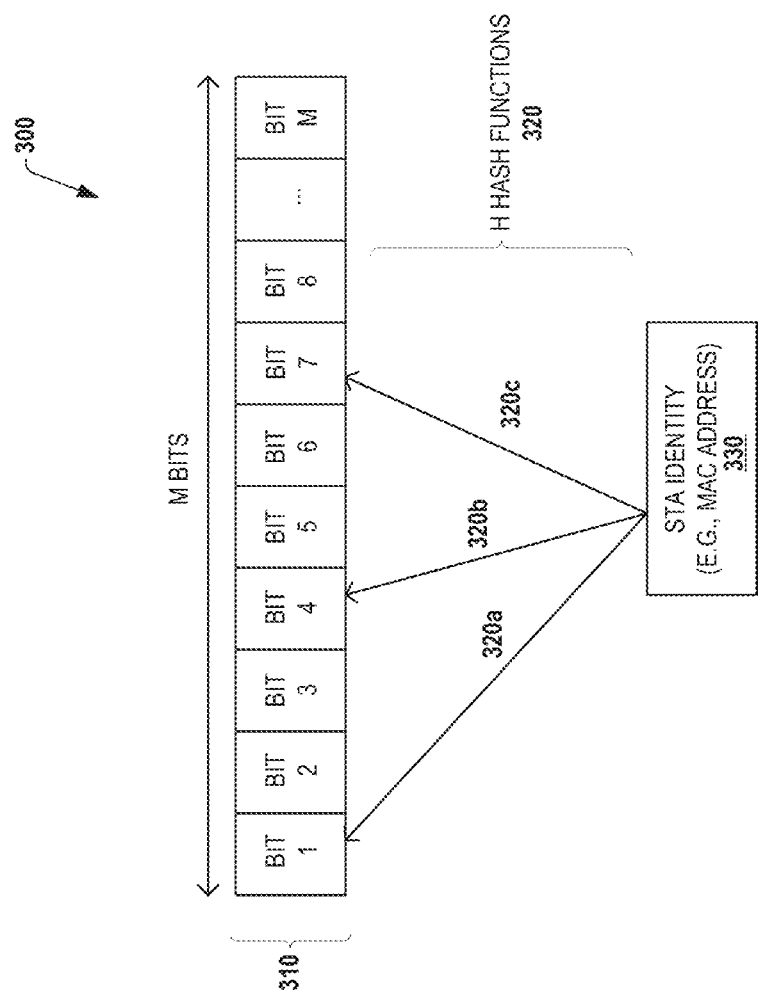
FIG. 3 depicts an example dynamic bit map, according to one or more example embodiments of the disclosure.

In some embodiments, different hash functions are used to map the wireless station identity 330 to different bits of the bit map 310. For example, each hash function may correspond to particular bit location in the bit map. As seen in FIG. 3, hash function 320a corresponds to a first bit location (e.g., Bit 1) of the bit map, 320b corresponds to a fourth bit location (e.g., Bit 4) of the bit map, and 320c corresponds to a seventh bit location (e.g., Bit 7) of the bit map. In this manner, one MAC address may be hashed by three different hash functions, which each correspond to three different bit locations in the bit map.

When a MAC address is hashed by a hash function, the bit location corresponding to the hash function may be set to "1." Otherwise, bit locations in the bit map may remain set to "0." A bit location set to 1 may correspond to a MAC address associated with a wireless device 120 for which the multicast frame is intended.

In some embodiments, these bit mapping operations may be executed by the transmitter (e.g., a transmitting wireless station STA A 120a of FIG. 2) to set the bit(s) of a bit map associated with a certain receiving wireless station 120 to 1 if that receiving wireless station 120 is intended to receive a multicast frame, has traffic, is included in a multicast group, desires to communicate, and/or the like. Any wireless device 120 may be a considered transmitter when the wireless device 120 has a multicast frame to transmit. Each wireless devices 120 may be enabled to discover and/or determine other wireless devices 120 that are within a predetermined proximity to one another. Based on this determination, the wireless devices 120 may share identity information (e.g., MAC addresses, and/or the like) and form a cluster as described in more detail below.

Figure 4:
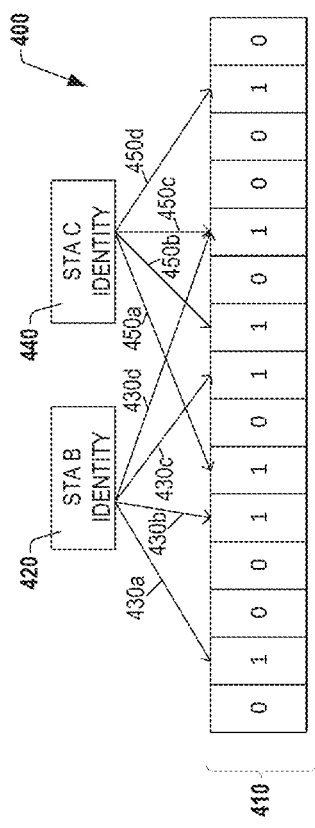
FIG. 4 depicts an example hashed dynamic bit map from a transmitter perspective, according to one or more example embodiments of the disclosure.

As seen in FIG. 4, bits set to 1 in bit map 410 of the exemplary hashing process 400 of FIG. 4 correspond to the hashed identities of one or more wireless stations 120 (e.g., STA B and STA C) included in a multicast group with a transmitting wireless station 120 (e.g., STA A). For example, assume STA B and STA C (receiving wireless stations) are to receive a multicast frame (e.g., a data packet, information, a communication, and/or the like) from STA A (e.g., a transmitting wireless station). An identity of STA B 420 (e.g., a MAC address) is hashed by four hash functions (e.g., hash functions 430*a*, 430*b*, 430*c*, 430*d*). The hashed STA B identity 420 is then inputted into the bit map 410 in a manner such that bit locations in the bit map corresponding to each respective hash function output (e.g., Bits 2, 5, 8, and 11) are set to "1" to indicate that STA B is indeed intended to receive and/or process the multicast frame. Similarly, an identity of STA C 440 (e.g., a MAC address) is hashed by four hash functions (e.g., hash functions 450*a*, 450*b*, 450*c*, 450*d*). The hashed STA C identity 440 is then inputted into the bit map 410 in a manner such that bit locations corresponding to each respective hash function output (e.g., Bits 6, 9, 11, and 14) are set to "1" to indicate that STA C is indeed to receive the multicast frame. Therefore, bits set to 1 indicate a hashed MAC address of wireless stations 120 (e.g., STA B and STA C) that are intended to receive the multicast frame from a transmitting wireless station (e.g., STA A).

Figure 5:
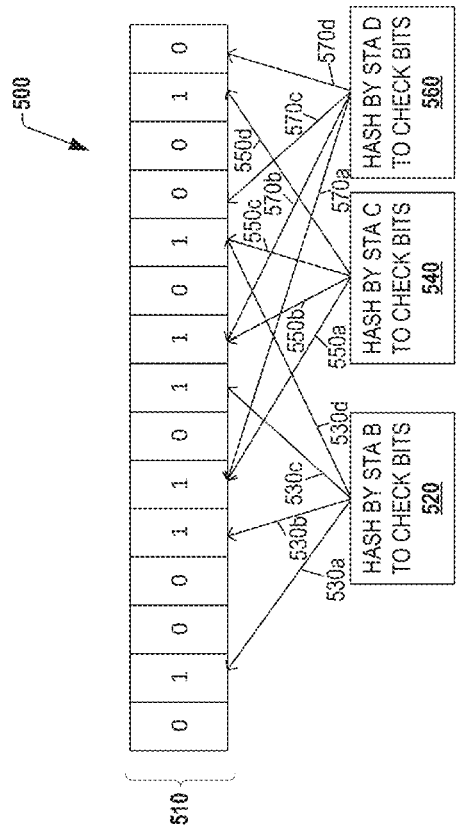
FIG. 5 depicts an example hashed dynamic bit map from a receiver perspective, according to one or more example embodiments of the disclosure.

FIG. 5 depicts an exemplary bit map receiving and decoding process 500 in accordance with the encoding example of FIG. 4. Continuing the above example, assume that STA A, STA B, STA C, and STA D are in a formed cluster of wireless stations. Further, assume that STA A is a transmitting wireless device, while STA B, STA C, and STA D are receiving wireless devices. However, assume that STA B and STA C are intended to receive a multicast frame from STA A, while STA D is not supposed to receive the multicast frame from STA A.

In some embodiments, each wireless station in a cluster of wireless stations may be configured to receive a broadcast of the bit map and/or multicast frame including the bit map (where the bitmap is included in a preamble portion of the multicast frame, for example) from the transmitting wireless station (e.g., STA A). In this manner, the transmitting wireless station (e.g., STA A) may broadcast the bit map to every wireless station in a cluster of wireless stations. Every other wireless station in the cluster may then receive the bit map and/or the multicast frame preamble portion including the bit map and, based on decoding the bit map, determine if the multicast frame is intended for receipt and/or processing by the wireless station. For example, each wireless station 120 (e.g., STA B, STA C, and STA D) may receive the bit map (e.g., bit map 510 of FIG. 5). Further, each receiving wireless station 120 (e.g., STA B 520, STA C 540, and STA D 560) may execute hash operations (e.g., 530*a-d*, 550*a-d*, and 570*a-d*) when processing the bit map to identify the bits of the bit map to which the hash operations correspond. For example, STA B 520 may utilize four hash functions (e.g., hash functions 530*a*, 530*b*, 530*c*, 530*d*) to identify the bit locations in the bit map that correspond to the hashed identity of STA B 520 (e.g., Bits 2, 5, 8, and 11). STA B 520 then determines whether the bit locations in the bit map that correspond to the hash operations used to encode the MAC address of STA B are set to 1, thus indicating that STA B 520 is intended to receive the multicast frame from STA A. If one or more of the bits in the bit locations of the bit map that correspond to the hash operations used to encode the MAC address of STA B 520 are set to 0, STA B 520 may determine that STA B 520 is not intended to receive the multicast frame from STA A. Similarly, STA C 540 may utilize four hash functions (e.g., hash functions 550*a*, 550*b*, 550*c*, 550*d*) to identify bit locations and the state of bits in the bit locations of the bit map that correspond to the hash operations used to encode the MAC address of STA C 540. STA C 540 then determines whether the bits in the bit locations of the bit map that correspond to hash operations used to encode the MAC address of STA C 540 are set to 1, thus indicating that STA C 540 is intended to receive the multicast frame from STA A. If the bits in the bit locations of the bit map that correspond to hash operations used to encode the MAC address of STA C 540 are set to 0, STA C 540 may determine that it is not intended to receive the multicast frame from STA A.

Even though STA D 560 is not intended to receive the multicast frame form STA A in our example, STA D 560 may also utilize four hash functions (e.g., hash functions 570*a*, 570*b*, 570*c*, 570*d*) to identify the bit locations in the bit map that correspond to the outputs of hash operations used to encode the MAC address of STA D 560. However, STA D 560 may determine, because at least one bit corresponding to outputs of hash operations used to encode the MAC address of STA D 560 is set to 0 (e.g., the bits corresponding to hash functions 570*c* and 570*d*), that it is not intended to receive the multicast frame from STA A. In this manner, receiving wireless stations 120 are enabled to determine if they are intended to receive and/or process the multicast frame In some embodiments, the same hash function(s) used by the transmitting wireless station 120 to map and/or set bit locations in the bit map may be used by the receiving wireless station 120 to identify the state of mapped bit in corresponding bit locations of the bit map. Alternatively, one or more hash function(s) used by the transmitting wireless station 120 (e.g., STA A) to map bits in the dynamic bit map may be different than those used by the receiving wireless station(s) 120 (e.g., STA B, STA C, STA D) to identify the state of mapped bits in corresponding bit locations of the bit map. In some embodiments, a transmitting wireless station 120 may generate a dynamic bit map for each transmission of a multicast frame. Alternatively, dynamic bit maps may be reused and/or between wireless stations 120 of a cluster of wireless stations 120.

The use of hash functions to identify mapped bits in the bit map may be referred to as a bloom filter. For example, when a number of bits M (e.g., bit map length) in a bit map is small, and a number of wireless stations 120, say N, is large, there may be a high probability of false positive rate. A rule of thumb may be that in order to allow for a 10%, 1%, and/or 0.1% false positive rate, M may be equal to 5*N, 10*N, and 15*N, respectively. In some embodiments, the false positive rate may be predetermined and/or configured by a user 110 (or other administrator) and may be static and/or dynamic for each wireless station 120. As such, M (e.g., the bit map length) may be dynamic and may be determined based at least in part on a desired false positive rate, a number of wireless stations 120, and/or the like. In this manner, a bloom filter may be utilized to minimize a false positive rate. Typically, a longer bit map corresponds to a lower false positive rate.

As an example, assume a MAC address may be 48 bits in length. Further, assume that there are ten wireless stations 120 in a formed cluster (e.g., within a predetermined proximity to one another), and a first wireless station 120 wants to indicate traffic or inclusion in a multicast group for five of the wireless stations 120 in the cluster without further message exchange for AID assignment or multicast group formation. Using previous transmission methods, a number of bits M in a bit map must be at least 240 bits (M=5 wireless stations 120*48 bits per MAC address=240 bits to be included in a bit map). However, utilizing a bloom filter to map the MAC addresses of the all ten wireless stations 120 drastically reduces the number of bits M required in a bit map. For example, with a 1% allowable false positive rate, only 100 bits may be required (M=10 wireless stations*10 bits per hashed MAC address=100), which represents a 60% reduction in the number of bits required to transmit the same information. Note that a degree of improvement may drop as the number of wireless stations 120 desired to be in a multicast group of a cluster becomes smaller (e.g., say two wireless stations 120). Therefore, in some embodiments, it may be determined to be more efficient to not utilize a bloom filter and instead simply transmit the entire MAC addresses of the 2 wireless stations 120 in a bit frame and/or in the multicast frame (e.g., without using hash functions). However, each wireless station 120 may be configured to choose and/or determine a usage of individual addressing or dynamic bitmap based on the efficiency. For example, a transmitting wireless station 120 may determine a number of bits required in a bit map for inputting an entire MAC address (e.g., 48 bits) of each wireless station 120 intended to receive and/or process the multicast frame as well as a number of bits required in a bit map for inputting an encoded (e.g., hashed) MAC address of each wireless station 120 intended to receive and/or process the multicast frame. Based on these calculations, the transmitting wireless station 120 may determine to utilize a MAC address indication mechanism (e.g., a transmission method) that requires a least number of bits in the bit frame. In some embodiments, each wireless station 120 may be configured to calculate an efficiency for all possible transmission modes and recommend a transmission mode determined to be most efficient.

As another example, suppose that there are four wireless stations 120 (e.g., STA A, STA B, STA C, and STA D as shown in the example system 200 of FIG. 2). Assume that STA A is transmitting and wants to multicast a frame (e.g., information, data, a message, an indication, and/or the like) to only STA B and STA C (therefore excluding STA D). STA A can generate a multicast dynamic bit map with 15 bits by hashing the identities (e.g., MAC addresses) of STA B and STA C with four hash functions and setting the bits in corresponding bit locations of the bit map to 1 as shown in a transmitter bit map 400 of FIG. 4.

On the receiving side, STA B, STA C, and STA D each perform hash functions with their respective identities (e.g., MAC addresses) to check the state of the bits in the corresponding bit locations of the bit map (e.g., receiver multicast dynamic bit map 500) as shown in FIG. 5. If all bits in bit locations of the multicast dynamic bit map that correspond to outputs of hash functions that hashed a wireless station identity are set to 1, then a wireless station 120 determines that the multicast frame is intended for itself and therefore may receive and/or process the multicast frame (e.g., information, traffic, and/or the like) from STA A.

In our example, STA B and STA C may determine a complete match between their respective hashed MAC addresses and the hashed MAC addresses included in the multicast dynamic bit map based on a comparison of their respective hashed MAC addresses and the hashed MAC addresses included in the multicast dynamic bit map. In the determinations, a bloom filter may be utilized by STA B and STA C. Because some bits corresponding to the hashed MAC address of STA D are set to 0, STA D may determine no match and/or a partial match between its respective hashed MAC address and the hashed MAC address included in the multicast dynamic bit map based on a comparison of its respective hashed MAC address and the hashed MAC address included in the multicast dynamic bit map. A bloom filter may also be utilized by STA D. After determinations are made, STA D will then know that this multicast frame not intended for itself and therefore will not receive and/or process the multicast frame from STA A.

In some embodiments, a wireless station 120 may desire to construct a dynamic bit map for directly transmitting a multicast frame (e.g., a data packet) to one or more neighboring wireless stations 120. Accordingly, a transmitting wireless station 120 may identify neighboring wireless stations 120. As described herein, the efficiency of a dynamic bit map depends on a suitable size of the bit map (M). The size of the bit map (e.g., M) may be estimated (e.g., determined) by the transmitting wireless station 120 based at least in part on an estimated number of receiving wireless stations 120 (N) that may receive and/or decode the frame. Hence, the transmitting wireless station 120 may identify one or more neighboring wireless stations 120 that may decode the bit map (e.g., identify wireless stations 120 within a predetermined proximity to the transmitting wireless station 120 and that are to receive a transmission). This identification process may be accomplished using location information associated with each wireless station 120 such as global positioning system (GPS) coordinates of each receiving wireless station 120, an Internet Protocol (IP) IP address of each wireless device 120, nearby communication tower information, communication of a signal, trigger frame, and/or information between wireless stations 120, and/or the like.

If a plurality of wireless stations 120 desire to transmit respective multicast frames, then each transmitting wireless station 120 may generate a respective bit map according to embodiments disclosed herein so that each multicast frame may be received and/or processed by the wireless stations 120 for which the multicast frame are intended. Alternatively, multiple transmitting wireless stations 120 may utilize a common bit map, particularly if the recipients of the respective multicast frames are the same (e.g., both transmitting wireless stations 120 are transmitting to all neighboring wireless stations 120). Bit maps may be transmitted, received, shared, generated, and/or stored by the wireless stations 120.

In some embodiments, each wireless station 120 within a predetermined range of other wireless stations 120 may observe (e.g., detect, receive) a transmission in a neighborhood (e.g., a geographic cluster) from each nearby wireless station 120, and wireless station 120 may utilize a counter to count a number of neighboring wireless stations 120. For example, whenever a wireless station 120 observes a transmission from a new wireless station 120, a counter can be incremented by one to denote that a wireless station 120 is nearby. An expiration time T can also be associated with each increment of the counter so that after passing of time T, the wireless station 120 can decrement the counter by 1, thereby denoting that a wireless station 120 is no longer within proximity and/or a retransmission is required to re-acknowledge a wireless station's 120 proximity. The transmission transmitted to and/or received by nearby wireless stations 120 may include identity information associated with the wireless station(s) 120 such as a media access control (MAC) address, a device identification (ID), a service ID, information associated with a user of the wireless station(s) 120, and/or the like.

In this manner, a wireless station 120 may determine a number N of nearby (e.g., neighboring) wireless stations 120. In some embodiments, a predetermined number that accommodates the largest possible number of wireless stations 120 in a neighborhood is used as N. Alternatively, a maximum value of the counter may be used as N. There may be other operations like security policy message exchanges or schedule negotiations between wireless stations 120, where certain wireless stations 120 have the knowledge of the number of neighboring wireless stations 120. These wireless stations 120 can then broadcast a message including the number of neighboring wireless stations 120 to share the information with the neighborhood (e.g., nearby wireless stations 120).

The transmitting wireless station 120 may also determine a number of nearby wireless stations 120 that are to receive a transmission based on a service identification. For example, ten nearby wireless stations 120 may be identified by a transmitting wireless station 120. However, only five of those ten identified nearby wireless stations 120 may be activated for a particular service (e.g., a communication service with a particular carrier and/or service provider, a particular communication type such as Wi-Fi, Bluetooth, and/or the like). Therefore, the transmitting wireless station 120 may determine that, based on a service compatibility and/or capability, the five nearby wireless stations 120 that are activated for the particular service are to receive a transmission. Accordingly, the transmitting wireless station 120 may encode (e.g., hash) into a dynamic bit map the identities (e.g., MAC addresses) of only the five wireless stations 120 that are activated for a particular service.

Next, the transmitting wireless station 120 may choose an indication mechanism (e.g., a transmission method) for communicating a multicast frame to an identified number of receiving wireless stations 120. First, the transmitting wireless station 120 identifies a number of wireless stations 120 determined to be within a predetermined proximity of the transmitting wireless station 120 as described above. Based at least in part on this identified number of proximate wireless station 120, the transmitting wireless station 120 determines a number of proximate wireless stations 120 that are intended to receive a multicast frame (e.g., receive information, data, traffic, and/or the like, be indicated, and/or the like) as described above. In some embodiments, the number of proximate wireless stations 120 that are to receive the multicast frame may be predetermined by an operator of the transmitting wireless station 120. Alternatively, the number of proximate wireless stations 120 that are to receive the multicast frame may be determined based on whether each proximate wireless station 120 is activated for a particular service.

The transmitting wireless station 120 may then determine a tolerable false positive rate for multicasting the multicast frame. For example, the tolerable false positive rate may be 10%, 1%, 0.1%, and/or the like, and typically corresponds to an amount of error that can be tolerated in transmissions between wireless stations 120. In some embodiments, the tolerable false positive rate may be determined based on a received message and/or request, a default setting, a user selection and/or input, and/or the like.

The transmitting wireless station 120 next may calculate (e.g., determine) a number of required bits to be included in a dynamic bit map for each different transmission mode using the tolerable false positive rate. For example, a number of required bits in the bit map may be determined for transmissions involving one or more complete MAC addresses, one or more hashed MAC addresses, one or more AIDs, location information, identity information, and/or the like. The number of required bits in the bit map may also be dependent on a number of wireless stations 120 to which the transmitting wireless station 120 desires to transmit data. For example, if there is a small number of wireless stations 120 to receive a transmission from the transmitting wireless station 120, then the transmitting wireless station 120 may determine that the transmission mode that utilizes a smallest number of bits in a bit map may be one that simply includes a complete MAC address of each receiving wireless station 120 in a bit map and/or in a multicast frame preamble. In this manner, instead of utilizing hash functions to encode a smaller number of bits of a dynamic bit map with a MAC address of a receiving wireless station 120, the transmitting wireless station 120 may directly input (e.g., without using hash functions) all bits of a MAC address into a bit map. Alternatively, if there is a large number of wireless stations 120 to receive a transmission from the transmitting wireless station 120, then the transmitting wireless station 120 may determine that the transmission mode that utilizes a smallest number of bits in a bit map may be one that utilizes hash functions to encode the MAC addresses of each receiving wireless station 120 into a dynamic bit map. Therefore, the transmitting wireless station 120 may determine and/or select to utilize a transmission mode with a smallest calculated overhead (e.g., smallest bit map size). As stated above, this determination may be based on a number of wireless stations 120 that are to receive the multicast frame. Additionally, the transmission mode may be selected by the transmitting wireless station 120 based on a comparison of calculated overhead (e.g., bit map sizes) associated with each different transmission mode.

Next, the transmitting wireless station 120 may construct a dynamic bit map. For example, the transmitting wireless station 120 may construct a dynamic bit map using hash functions as described herein if it is determined that utilizing a dynamic bit map is the most efficient mode of transmission. Alternatively, the transmitting wireless station 120 may construct a static bit map using a complete MAC address of each receiving wireless station 120 if it is determined by the transmitting wireless station 120 that this type of communication method requires less overhead (e.g., a smaller sized bit map).

When constructing a dynamic bit map, the transmitting wireless station 120 typically maps an identity (e.g., a MAC address) of one or more wireless stations 120 intended to receive and/or process a multicast frame to one or more bit locations of the dynamic bit map using one or more hash functions. In some embodiments, only one hash function may be utilized to encode (e.g., set) bit locations in the bit map corresponding to outputs of hash functions that hash the identity of the wireless stations 120. Alternatively, multiple hash functions may be utilized. When mapped, bits in the bit map corresponding to a hashed identity of a receiving wireless station 120 may be set to a value of 1. Mapping the identity of one or more receiving STAs 120 may include formatting the MAC addresses of each receiving STA 120 into a predetermined common format. Typically, the format is agreed upon by users, administrators, service providers, and/or the like associated with all wireless stations 120 so that the wireless stations 120 may readily identify each hashed MAC address.

Further, mapping the identity of each receiving wireless station 120 may include mapping the identities of the receiving wireless stations 120 using one or more predetermined hash functions. The hash functions (and/or a bit map key) used to map the identities of the receiving wireless stations 120 may be included in the multicast frame (e.g., data, transmission, and/or the like) transmitted by the transmitting wireless station 120. In this manner, upon receipt of the multicast frame, the receiving wireless stations 120 may identify the hash functions used to map the identities of the receiving wireless stations 120 and therefore may understand which hash functions were used, as well as which bit locations in the bit map correspond to each hashed identity of each receiving wireless station 120. In some embodiments, a predetermined group of hash functions can be predetermined for a specific false positive rate. For example, a group of hash functions may be assigned for dynamically mapping MAC addresses of receiving wireless stations 120 (e.g., wireless stations 120 for which a multicast frame is intended) in the bit map for a 10% false positive rate, a 1% false positive rate, and/or a 0.1% false positive rate. Additionally, a group and/or a number of hash functions may be utilized for mapping an identity of each receiving wireless station 120 and/or all receiving wireless stations 120. The transmitting wireless station 120 may determine and/or select a number of hash functions to be utilized, as well as determine and/or select one or more hash functions or group(s) of hash functions to be utilized. For example, the transmitting wireless station 120 may determine a number of hash functions to be utilized based on a number of wireless stations 120 for which the multicast frame is intended, signal strength, time of day, and/or a variety of other parameters. The group and/or number of hash functions utilized may be included in the bit map and/or indicated by a state of a bit included in the bit map and/or the multicast frame.

Upon construction of the dynamic bit map, the transmitting wireless station 120 may transmit the dynamic bit map and/or the multicast frame including the dynamic bit map to one or more receiving wireless stations 120. Alternatively, the transmitting wireless station 120 may transmit the dynamic bit map and/or the multicast frame including the dynamic bit map to all neighboring (e.g., nearby) wireless stations 120. The receiving wireless stations 120 then may receive and/or process the dynamic bit map and/or the multicast frame including the dynamic bit map, and utilize the dynamic bit map to determine whether or not the multicast frame is intended for decoding, receipt, and/or processing by each receiving wireless station 120. If it is determined by a receiving wireless station 120 that it is supposed to receive and/or process the multicast frame based on the dynamic bit map (e.g., the MAC address of the wireless station 120 is hashed into the bit map and all corresponding bits in the bit map are set to 1), then the wireless station 120 may receive and/or process the multicast frame (e.g., data, transmission, and/or the like). If it is determined by a receiving wireless station 120 that it is not supposed to receive the multicast frame based on the dynamic bit map (e.g., the MAC address of the wireless station 120 is hashed into the bit map and not all corresponding bits in the bit map are set to 1 (some corresponding bits are set to 0)), then the wireless station 120 may not receive and/or process the multicast frame (e.g., data, transmission, and/or the like). Processing the multicast frame may include receiving, transmitting, opening, selecting, and/or any other similar operation and/or interaction. In some embodiments, an acknowledgment, an alert, a notification, a message, and/or the like indicating that the multicast frame has been received by the receiving wireless device 120 may be generated and transmitted by the receiving wireless device to the transmitting wireless device 120.

All in all, embodiments described herein enable the transmission of data between wireless stations 120 without utilizing a central access point 110. In this manner, fewer exchanges may be required to establish a multicast group of wireless stations 120. Further, by dynamically encoding each receiving wireless station's 120 MAC address using hash functions, less overhead may be required in a bit map, particularly for a large number of receiving wireless stations 120.

Figure 6:
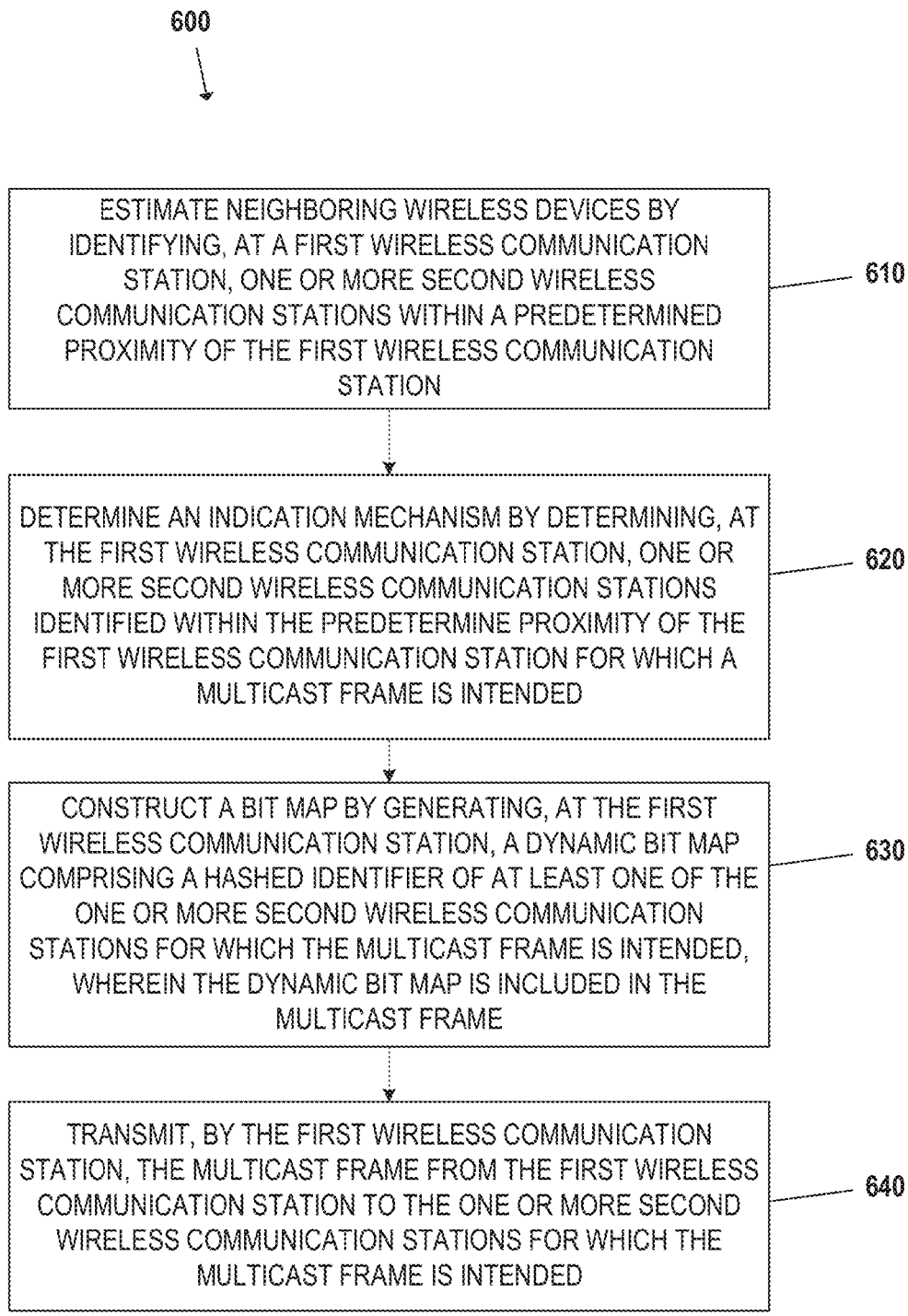
FIG. 6 depicts an example process flow for constructing a dynamic bit map, according to one or more example embodiments of the disclosure.

FIG. 6 illustrates an exemplary process flow 600 for constructing a dynamic bit map. At block 610, the process may include identifying, at the first wireless communication station, one or more second wireless communication stations within a predetermined proximity of the first wireless communication station. At block 620, the process may include determining, at the first wireless communication station, one or more second wireless communication stations identified within the predetermined proximity of the first wireless communication station for which a multicast frame is intended. At block 630, the process may include generating, at the first wireless communication station, a dynamic bit map comprising a hashed identifier of at least one of the one or more second wireless communication stations for which the multicast frame is intended, wherein the dynamic bit map is included in a preamble of the multicast frame. At block 640, the process may include causing to transmit, by the first wireless communication station, the multicast frame from the first wireless communication station to the one or more second wireless communication stations for which the multicast frame is intended.

Figure 7:
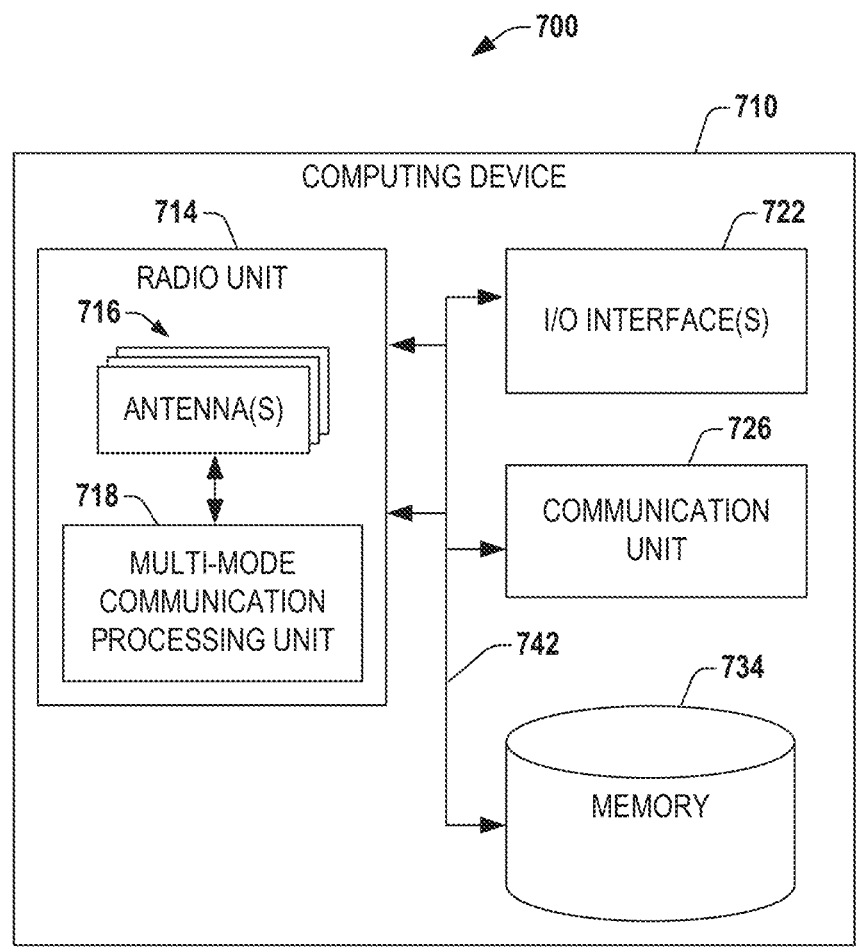
FIG. 7 depicts an example of a communication device, according to one or more example embodiments of the disclosure.

FIG. 7 illustrates a block-diagram of an example embodiment 700 of a computing device 710 that can operate in accordance with at least certain aspects of the disclosure. In one aspect, the computing device 710 can operate as a wireless device and can embody or can comprise an access point (e.g., access point 110), a wireless station (e.g., wireless station(s) 120), a receiving and/or transmitting station, and/or other types of communication device that can transmit and/or receive wireless communications in accordance with this disclosure. To permit wireless communication, including mapping techniques as described herein, the computing device 710 includes a radio unit 714 and a communication unit 726. In certain implementations, the communication unit 726 can generate data packets or other types of information blocks via a network stack, for example, and can convey data packets or other types of information block to the radio unit 714 for wireless communication. In one embodiment, the network stack (not shown) can be embodied in or can constitute a library or other types of programming module, and the communication unit 726 can execute the network stack in order to generate a data packet or another type of information block (e.g., a trigger frame, a bit map, and/or the like). Generation of a data packet or an information block can include, for example, generation of control information (e.g., checksum data, communication address(es)), traffic information (e.g., payload data), scheduling information (e.g., station information, allocation information, and/or the like), an indication, and/or formatting of such information into a specific packet header and/or preamble.

Figure 8:
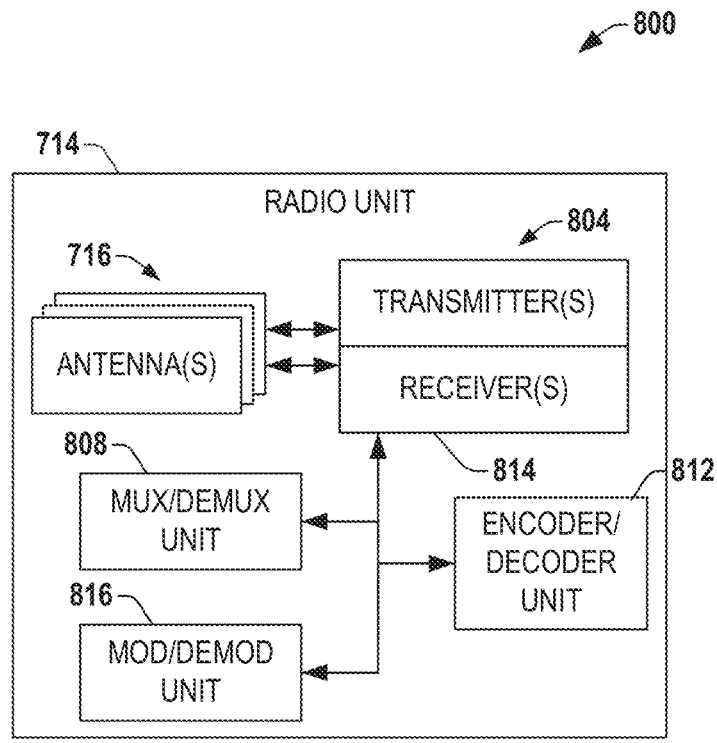
FIG. 8 depicts an example of a radio unit, according to one or more example embodiments of the disclosure.

As illustrated, the radio unit 714 can include one or more antennas 716 and a multi-mode communication processing unit 718. In certain embodiments, the antenna(s) 716 can be embodied in or can include directional or omnidirectional antennas, including, for example, dipole antennas, monopole antennas, patch antennas, loop antennas, microstrip antennas or other types of antennas suitable for transmission of RF signals. In addition, or in other embodiments, at least some of the antenna(s) 716 can be physically separated to leverage spatial diversity and related different channel characteristics associated with such diversity. In addition or in other embodiments, the multi-mode communication processing unit 718 that can process at least wireless signals in accordance with one or more radio technology protocols and/or modes (such as MIMO, MU-MIMO (e.g., multiple user-MIMO), single-input-multiple-output (SIMO), multiple-input-single-output (MISO), and/or the like. Each of such protocol(s) can be configured to communicate (e.g., transmit, receive, or exchange) data, metadata, and/or signaling over a specific air interface. The one or more radio technology protocols can include 3GPP UMTS; LTE; LTE-A; Wi-Fi protocols, such as those of the Institute of Electrical and Electronics Engineers (IEEE) 802.11 family of standards; Worldwide Interoperability for Microwave Access (WiMAX); radio technologies and related protocols for ad hoc networks, such as Bluetooth or ZigBee; other protocols for packetized wireless communication; or the like). The multi-mode communication processing unit 718 also can process non-wireless signals (analogic, digital, a combination thereof, or the like). In one embodiment (e.g., example embodiment 800 shown in FIG. 8), the multi-mode communication processing unit 718 can comprise a set of one or more transmitters/receivers 804, and components therein (amplifiers, filters, analog-to-digital (A/D) converters, etc.), functionally coupled to a multiplexer/demultiplexer (mux/demux) unit 808, a modulator/demodulator (mod/demod) unit 816 (also referred to as modem 816), and an encoder/decoder unit 812 (also referred to as codec 812). Each of the transmitter(s)/receiver(s) can form respective transceiver(s) that can transmit and receive wireless signal (e.g., streams, electromagnetic radiation) via the one or more antennas 716. It should be appreciated that in other embodiments, the multi-mode communication processing unit 718 can include other functional elements, such as one or more sensors, a sensor hub, an offload engine or unit, a combination thereof, or the like.

Electronic components and associated circuitry, such as mux/demux unit 808, codec 812, and modem 816 can permit or facilitate processing and manipulation (e.g., coding/decoding, deciphering, and/or modulation/demodulation), of signal(s) received by the computing device 710 and signal(s) to be transmitted by the computing device 710. In one aspect, as described herein, received and transmitted wireless signals can be modulated and/or coded, or otherwise processed, in accordance with one or more radio technology protocols. Such radio technology protocol(s) can include 3GPP UMTS; 3GPP LTE; LTE-A; Wi-Fi protocols, such as IEEE 802.11 family of standards (IEEE 802.ac, IEEE 802.ax, and the like); WiMAX; radio technologies and related protocols for ad hoc networks, such as Bluetooth or ZigBee; other protocols for packetized wireless communication; or the like.

The electronic components in the described communication unit, including the one or more transmitters/receivers 804, can exchange information (e.g., data packets, allocation information, data, metadata, code instructions, signaling and related payload data, bit maps, combinations thereof, or the like) through a bus 814, which can embody or can comprise at least one of a system bus, an address bus, a data bus, a message bus, a reference link or interface, a combination thereof, or the like. Each of the one or more receivers/transmitters 804 can convert signal from analog to digital and vice versa. In addition or in the alternative, the receiver(s)/transmitter(s) 804 can divide a single data stream into multiple parallel data streams, or perform the reciprocal operation. Such operations may be conducted as part of various multiplexing schemes. As illustrated, the mux/demux unit 808 is functionally coupled to the one or more receivers/transmitters 804 and can permit processing of signals in time and frequency domain. In one aspect, the mux/demux unit 808 can multiplex and demultiplex information (e.g., data, metadata, and/or signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition or in the alternative, in another aspect, the mux/demux unit 808 can scramble and spread information (e.g., codes) according to most any code, such as Hadamard-Walsh codes, Baker codes, Kasami codes, polyphase codes, and the like. The modem 816 can modulate and demodulate information (e.g., data, metadata, signaling, or a combination thereof) according to various modulation techniques, such as OFDMA, ODCA, EDCA, frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In addition, processor(s) that can be included in the computing device 710 (e.g., processor(s) included in the radio unit 714 or other functional element(s) of the computing device 710) can permit processing data (e.g., symbols, bits, or chips) for multiplexing/demultiplexing, modulation/demodulation (such as implementing direct and inverse fast Fourier transforms) selection of modulation rates, selection of data packet formats, inter-packet times, and the like.

The codec 812 can operate on information (e.g., data, metadata, signaling, or a combination thereof) in accordance with one or more coding/decoding schemes suitable for communication, at least in part, through the one or more transceivers formed from respective transmitter(s)/receiver(s) 804. In one aspect, such coding/decoding schemes, or related procedure(s), can be retained as a group of one or more computer-accessible instructions (computer-readable instructions, computer-executable instructions, or a combination thereof) in one or more memory devices 734 (referred to as memory 734). In a scenario in which wireless communication among the computing device 710 and another computing device (e.g., an access point 110, a wireless station 120, a station and/or other types of user equipment) utilizes MU-MIMI, MIMO, MISO, SIMO, or SISO operation, the codec 812 can implement at least one of space-time block coding (STBC) and associated decoding, or space-frequency block (SFBC) coding and associated decoding. In addition or in the alternative, the codec 812 can extract information from data streams coded in accordance with spatial multiplexing scheme. In one aspect, to decode received information (e.g., data, metadata, signaling, or a combination thereof), the codec 812 can implement at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. The codec 812 can utilize, at least in part, mux/demux component 808 and mod/demod component 816 to operate in accordance with aspects described herein.

The computing device 710 can operate in a variety of wireless environments having wireless signals conveyed in different electromagnetic radiation (EM) frequency bands and/or subbands. To at least such end, the multi-mode communication processing unit 718 in accordance with aspects of the disclosure can process (code, decode, format, etc.) wireless signals within a set of one or more EM frequency bands (also referred to as frequency bands) comprising one or more of radio frequency (RF) portions of the EM spectrum, microwave portion(s) of the EM spectrum, or infrared (IR) portion of the EM spectrum. In one aspect, the set of one or more frequency bands can include at least one of (i) all or most licensed EM frequency bands, (such as the industrial, scientific, and medical (ISM) bands, including the 2.4 GHz band or the 5 GHz bands); or (ii) all or most unlicensed frequency bands (such as the 60 GHz band) currently available for telecommunication.

The computing device 710 can receive and/or transmit information encoded and/or modulated or otherwise processed in accordance with aspects of the present disclosure. To at least such an end, in certain embodiments, the computing device 710 can acquire or otherwise access information, wirelessly via the radio unit 714 (also referred to as radio 714), where at least a portion of such information can be encoded and/or modulated in accordance with aspects described herein. More specifically, for example, the information can include data packets and/or physical layer headers (e.g., preambles and included information such as allocation information, bit maps, and/or the like), a signal, and/or the like in accordance with embodiments of the disclosure, such as those shown in FIGS. 1-6.

The memory 734 can contain one or more memory elements having information suitable for processing information received according to a predetermined communication protocol (e.g., IEEE 802.11ac or IEEE 802.11ax). While not shown, in certain embodiments, one or more memory elements of the memory 734 can include computer-accessible instructions that can be executed by one or more of the functional elements of the computing device 710 in order to implement at least some of the functionality for applying mapping techniques as described herein, including processing of information communicated (e.g., encoded, modulated, and/or arranged) in accordance with aspect of the disclosure. One or more groups of such computer-accessible instructions can embody or can constitute a programming interface that can permit communication of information (e.g., data, metadata, and/or signaling) between functional elements of the computing device 710 for implementation of such functionality.

In addition, in the illustrated computing device 700, a bus architecture 742 (also referred to as bus 742) can permit the exchange of information (e.g., data, metadata, bit maps, and/or signaling) between two or more of (i) the radio unit 714 or a functional element therein, (ii) at least one of the I/O interface(s) 722, (iii) the communication unit 726, or (iv) the memory 734. In addition, one or more application programming interfaces (APIs) (not depicted in FIG. 7) or other types of programming interfaces that can permit exchange of information (e.g., trigger frames, streams, data packets, allocation information, bit maps, data and/or metadata) between two or more of the functional elements of the client device 710. At least one of such API(s) can be retained or otherwise stored in the memory 734. In certain embodiments, it should be appreciated that at least one of the API(s) or other programming interfaces can permit the exchange of information within components of the communication unit 726. The bus 742 also can permit a similar exchange of information.

Figure 9:
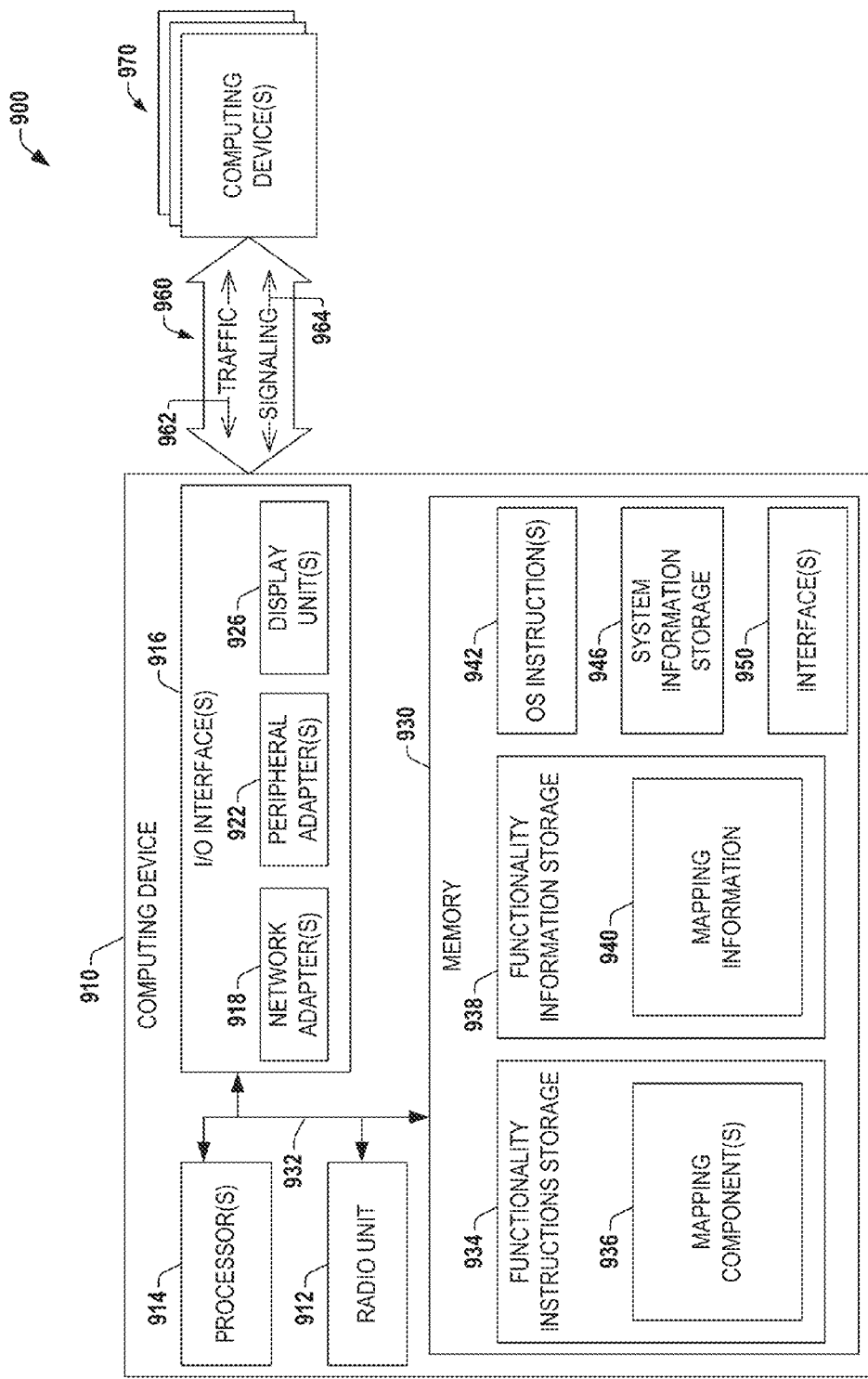
FIG. 9 depicts an example of a computational environment, according to one or more example embodiments of the disclosure.

FIG. 9 illustrates an example of a computational environment 900 for applying mapping techniques as in accordance with one or more aspects of the disclosure. The example computational environment 900 is only illustrative and is not intended to suggest or otherwise convey any limitation as to the scope of use or functionality of such computational environments' architecture. In addition, the computational environment 900 should not be interpreted as having any dependency or requirement relating to any one or combination of components illustrated in this example computational environment. The illustrative computational environment 900 can embody or can include, for example, the computing device 710, an access point 110, a wireless station 120, and/or any other computing device that can implement or otherwise leverage mapping techniques as described herein.

The computational environment 900 represents an example of a software implementation of the various aspects or features of the disclosure in which the processing or execution of operations described in connection with mapping techniques described herein, including processing of information communicated (e.g., encoded, modulated, and/or arranged) in accordance with this disclosure, can be performed in response to execution of one or more software components at the computing device 910. It should be appreciated that the one or more software components can render the computing device 910, or any other computing device that contains such components, a particular machine for mapping techniques described herein, including processing of information encoded, modulated, and/or arranged in accordance with aspects described herein, among other functional purposes. A software component can be embodied in or can comprise one or more computer-accessible instructions (e.g., non-transitory computer-readable and/or computer-executable instructions). At least a portion of the computer-accessible instructions can embody one or more of the example techniques disclosed herein. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 910 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 910 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with mapping techniques, including processing of information communicated (e.g., encoded, modulated, and/or arranged) in accordance with features described herein, can comprise personal computers; server computers; laptop devices; handheld computing devices, such as mobile tablets; wearable computing devices; and multiprocessor systems. Additional examples can include set top boxes, programmable consumer electronics, network PCs, minicomputers, mainframe computers, blade computers, programmable logic controllers, distributed computing environments that comprise any of the above systems or devices, and the like.

As illustrated, the computing device 910 can comprise one or more processors 914, one or more input/output (I/O) interfaces 916, a memory 930, and a bus architecture 932 (also termed bus 932) that functionally couples various functional elements of the computing device 910. The bus 932 can include at least one of a system bus, a memory bus, an address bus, or a message bus, and can permit exchange of information (data, metadata, and/or signaling) between the processor(s) 914, the I/O interface(s) 916, and/or the memory 930, or respective functional element therein. In certain scenarios, the bus 932 in conjunction with one or more internal programming interfaces 950 (also referred to as interface(s) 950) can permit such exchange of information. In scenarios in which processor(s) 914 include multiple processors, the computing device 910 can utilize parallel computing.

The I/O interface(s) 916 can permit or otherwise facilitate communication of information between the computing device and an external device, such as another computing device (e.g., a network element or an end-user device. Such communication can include direct communication or indirect communication, such as exchange of information between the computing device 910 and the external device via a network or elements thereof. As illustrated, the I/O interface(s) 916 can comprise one or more of network adapter(s) 918, peripheral adapter(s) 922, and display unit(s) 926. Such adapter(s) can permit or facilitate connectivity between the external device and one or more of the processor(s) 914 or the memory 930. In one aspect, at least one of the network adapter(s) 918 can couple functionally the computing device 910 to one or more computing devices 970 via one or more traffic and signaling pipes 960 that can permit or facilitate exchange of traffic 962 and signaling 964 between the computing device 910 and the one or more computing devices 970. Such network coupling provided at least in part by the at least one of the network adapter(s) 918 can be implemented in a wired environment, a wireless environment, or both. The information that is communicated by the at least one network adapter can result from implementation of one or more operations in a method of the disclosure. Such output can be any form of visual representation, including, but not limited to, textual, graphical, animation, audio, tactile, and the like. In certain scenarios, each access point 110, wireless station 120, station, and/or other device can have substantially the same architecture as the computing device 910. In addition or in the alternative, the display unit(s) 926 can include functional elements (e.g., lights, such as light-emitting diodes; a display, such as liquid crystal display (LCD), combinations thereof, or the like) that can permit control of the operation of the computing device 910, or can permit conveying or revealing operational conditions of the computing device 910.

In one aspect, the bus 932 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, Universal Serial Bus (USB), and the like. The bus 932, and all buses described herein can be implemented over a wired or wireless network connection and each of the subsystems, including the processor(s) 914, the memory 930 and memory elements therein, and the I/O interface(s) 916 can be contained within one or more remote computing devices 970 at physically separate locations, connected through buses of this form, in effect implementing a fully distributed system.

The computing device 910 can comprise a variety of computer-readable media. Computer readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 910, and can comprise, for example, both volatile and non-volatile media, and removable and/or non-removable media. In one aspect, the memory 930 can comprise computer-readable media in the form of volatile memory, such as random access memory (RAM), and/or non-volatile memory, such as read only memory (ROM).

The memory 930 can comprise functionality instructions storage 934 and functionality information storage 938. The functionality instructions storage 934 can comprise computer-accessible instructions that, in response to execution (by at least one of the processor(s) 914), can implement one or more of the functionalities of the disclosure. The computer-accessible instructions can embody or can comprise one or more software components illustrated as mapping component(s) 936. In one scenario, execution of at least one component of the mapping component(s) 936 can implement one or more of the techniques disclosed herein. For instance, such execution can cause a processor that executes the at least one component to carry out a disclosed example method. It should be appreciated that, in one aspect, a processor of the processor(s) 914 that executes at least one of the mapping component(s) 936 can retrieve information from or retain information in a memory element 940 in the functionality information storage 938 in order to operate in accordance with the functionality programmed or otherwise configured by the mapping component(s) 936. Such information can include at least one of code instructions, information structures, or the like. At least one of the one or more interfaces 950 (e.g., application programming interface(s)) can permit or facilitate communication of information between two or more components within the functionality instructions storage 934. The information that is communicated by the at least one interface can result from implementation of one or more operations in a method of the disclosure. In certain embodiments, one or more of the functionality instructions storage 934 and the functionality information storage 938 can be embodied in or can comprise removable/non-removable, and/or volatile/non-volatile computer storage media.

At least a portion of at least one of the mapping component(s) 936 or mapping information 940 can program or otherwise configure one or more of the processors 914 to operate at least in accordance with the functionality described herein. One or more of the processor(s) 914 can execute at least one of such components and leverage at least a portion of the information in the storage 938 in order to provide random mapping techniques in accordance with one or more aspects described herein. More specifically, yet not exclusively, execution of one or more of the component(s) 936 can permit transmitting and/or receiving information at the computing device 910, where the at least a portion of the information includes one or more streams of trigger frames (e.g., a bit map) as described in connection with FIGS. 1-6, for example.

It should be appreciated that, in certain scenarios, the functionality instruction(s) storage 934 can embody or can comprise a computer-readable non-transitory storage medium having computer-accessible instructions that, in response to execution, cause at least one processor (e.g., one or more of processor(s) 914) to perform a group of operations comprising the operations or blocks described in connection with the disclosed methods.

In addition, the memory 930 can comprise computer-accessible instructions and information (e.g., data and/or metadata) that permit or facilitate operation and/or administration (e.g., upgrades, software installation, any other configuration, or the like) of the computing device 910. Accordingly, as illustrated, the memory 930 can comprise a memory element 942 (labeled OS instruction(s) 942) that contains one or more program modules that embody or include one or more OSs, such as Windows operating system, Unix, Linux, Symbian, Android, Chromium, and substantially any OS suitable for mobile computing devices or tethered computing devices. In one aspect, the operational and/or architecture complexity of the computing device 910 can dictate a suitable OS. The memory 930 also comprises a system information storage 946 having data and/or metadata that permits or facilitate operation and/or administration of the computing device 910. Elements of the OS instruction(s) 942 and the system information storage 946 can be accessible or can be operated on by at least one of the processor(s) 914.

It should be recognized that while the functionality instructions storage 934 and other executable program components, such as the operating system instruction(s) 942, are illustrated herein as discrete blocks, such software components can reside at various times in different memory components of the computing device 910, and can be executed by at least one of the processor(s) 914. In certain scenarios, an implementation of the mapping component(s) 936 can be retained on or transmitted across some form of computer readable media.

The computing device 910 and/or one of the computing device(s) 970 can include a power supply (not shown), which can power up components or functional elements within such devices. The power supply can be a rechargeable power supply (e.g., a rechargeable battery) and it can include one or more transformers to achieve a power level suitable for operation of the computing device 910 and/or one of the computing device(s) 970, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 918) to connect operationally to the conventional power grid. In another aspect, the power supply can include an energy conversion component, such as a solar panel, to provide additional or alternative power resources or autonomy for the computing device 910 and/or one of the computing device(s) 970.

The computing device 910 can operate in a networked environment by utilizing connections to one or more remote computing devices 970. As an illustration, a remote computing device can be a personal computer, a portable computer, a server, a router, a network computer, a peer device or other common network node, and so on. As described herein, connections (physical and/or logical) between the computing device 910 and a computing device of the one or more remote computing devices 970 can be made via one or more traffic and signaling pipes 960, which can comprise wireline link(s) and/or wireless link(s) and several network elements (such as routers or switches, concentrators, servers, and the like) that form a local area network (LAN) and/or a wide area network (WAN). Such networking environments are conventional and commonplace in dwellings, offices, enterprise-wide computer networks, intranets, local area networks, and wide area networks.

Figure 10:
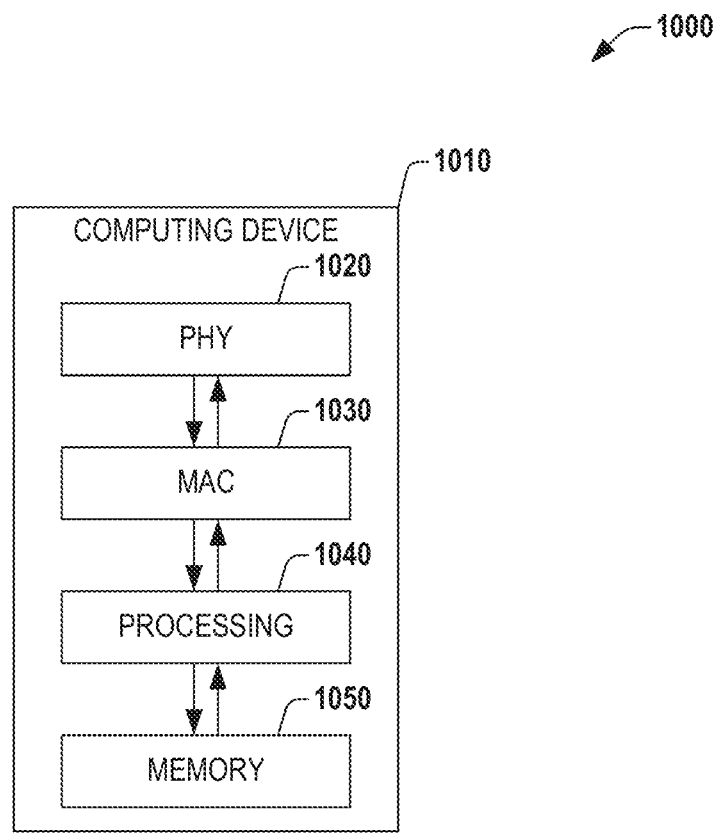
FIG. 10 depicts another example of a communication device, according to one or more example embodiments of the disclosure.

FIG. 10 presents another example embodiment 1000 of a computing device 1010 in accordance with one or more embodiments of the disclosure. In certain implementations, the computing device 1010 can be a HEW-compliant device that may be configured to communicate with one or more other HEW devices and/or other types of communication devices, such as legacy communication devices. HEW devices and legacy devices also may be referred to as HEW stations (STAs) and legacy STAs, respectively. In one implementation, the computing device 1010 can operate as an access point 110, a wireless station 120, and/or another device. As illustrated, the computing device 1010 can include, among other things, physical layer (PHY) circuitry 1020 and medium-access-control layer (MAC) circuitry 1030. In one aspect, the PHY circuitry 1010 and the MAC circuitry 1030 can be HEW compliant layers and also can be compliant with one or more legacy IEEE 802.11 standards. In one aspect, the MAC circuitry 1030 can be arranged to configure physical layer converge protocol (PLCP) protocol data units (PPDUs) and arranged to transmit and receive PPDUs, among other things. In addition or in other embodiments, the computing device 1010 also can include other hardware processing circuitry 1040 (e.g., one or more processors) and one or more memory devices 1050 configured to perform the various operations described herein.

In certain embodiments, the MAC circuitry 1030 can be arranged to contend for a wireless medium during a contention period to receive control of the medium for the HEW control period and configure an HEW PPDU. In addition or in other embodiments, the PHY 1020 can be arranged to transmit the HEW PPDU. The PHY circuitry 1020 can include circuitry for modulation/demodulation, upconversion/downconversion, filtering, amplification, etc. As such, the computing device 1010 can include a transceiver to transmit and receive data such as HEW PPDU. In certain embodiments, the hardware processing circuitry 1040 can include one or more processors. The hardware processing circuitry 1040 can be configured to perform functions based on instructions being stored in a memory device (e.g., RAM or ROM) or based on special purpose circuitry. In certain embodiments, the hardware processing circuitry 1040 can be configured to perform one or more of the mapping functions described herein, and/or the like.

In certain embodiments, one or more antennas may be coupled to or included in the PHY circuitry 1020. The antenna(s) can transmit and receive wireless signals, including transmission of HEW packets. As described herein, the one or more antennas can include one or more directional or omnidirectional antennas, including dipole antennas, monopole antennas, patch antennas, loop antennas, microstrip antennas or other types of antennas suitable for transmission of RF signals. In scenarios in which MIMO communication is utilized, the antennas may be physically separated to leverage spatial diversity and the different channel characteristics that may result.

The memory 1050 can retain or otherwise store information for configuring the other circuitry to perform operations for configuring and transmitting HEW packets and performing the various operations described herein including the allocation of and using of bandwidth (AP) and using the allocation of the bandwidth (STA).

The computing device 1010 can be configured to communicate using OFDMA communication signals over a multicarrier communication channel. More specifically, in certain embodiments, the computing device 1010 can be configured to communicate in accordance with one or more specific radio technology protocols, such as the IEEE family of standards including IEEE 802.11-2012, IEEE 802.11n-2009, IEEE 802.11ac-2013, IEEE 802.11ax, DensiFi, and/or proposed specifications for WLANs. In one of such embodiments, the computing device 1010 can utilize or otherwise rely on symbols having a duration that is four times the symbol duration of IEEE 802.11n and/or IEEE 802.11ac. It should be appreciated that the disclosure is not limited in this respect and, in certain embodiments, the computing device 1010 also can transmit and/or receive wireless communications in accordance with other protocols and/or standards.

The computing device 1010 can be embodied in or can constitute a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as IEEE 802.11 or IEEE 802.16, or other types of communication device that may receive and/or transmit information wirelessly. Similarly to the computing device 910, the computing device 1010 can include, for example, one or more of a keyboard, a display, a non-volatile memory port, multiple antennas, a graphics processor, an application processor, speakers, and other mobile device elements. The display may be an LCD screen including a touch screen.

It should be appreciated that while the computing device 1010 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In certain embodiments, the functional elements may refer to one or more processes operating or otherwise executing on one or more processors.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

The word "exemplary" is used herein to mean "serving as an example, instance, or illustration." Any embodiment described herein as "exemplary" is not necessarily to be construed as preferred or advantageous over other embodiments. The terms "wireless station," "station" (also referred to as STA), "communication station," "communication device," "computing device," "handheld device," "mobile device," "wireless device," "user device," and/or "user equipment" (UE) as used herein refers to a wireless communication device such as a cellular telephone, smartphone, tablet, netbook, wireless terminal, laptop computer, a femtocell, High Data Rate (HDR) subscriber station, access point, access terminal, or other personal communication system (PCS) device. The device may be either mobile or stationary.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

In some embodiments, a non-transitory computer readable medium for utilizing a dynamic indication map for multicast group and traffic indication is provided. The non-transitory computer readable medium includes instructions stored thereon, which when executed by one or more processor(s) of a first wireless communication station, cause the device to perform operations of: identifying, at the first wireless communication station, one or more second wireless communication stations within a predetermined proximity of the first wireless communication station; determining, at the first wireless communication station, one or more second wireless communication stations identified within the predetermined proximity of the first wireless communication station for which a multicast frame is intended; generating, at the first wireless communication station, a bit map comprising a hashed identifier of each of the one or more second wireless communication stations for which the multicast frame is intended, wherein the bit map is included in the multicast frame; and causing to transmit, by the first wireless communication station, the multicast frame from the first wireless communication station to the one or more second wireless communication stations for which the multicast frame is intended.

In some embodiments, identifying one or more second wireless communication stations within a predetermined proximity of the first wireless communication station comprises: incrementing a counter when a second wireless communication device is determined to be within a predetermined distance from the first wireless communication station; and decrementing the counter when a predetermined time T lapses, wherein the predetermined time T is measured from an increment of the counter.

In some embodiments, determining one or more second wireless communication stations identified within the predetermined proximity of the first wireless communication station are to receive a multicast frame from the first wireless communication station comprises: determining a tolerable false positive rate based on determining a number of wireless communication stations for which the multicast frame is intended.

In some embodiments, the bit map defines a bit map length based at least in part on a determined number of the one or more second wireless communication stations for which the multicast frame is intended and the tolerable false positive rate.

In some embodiments, the hashed identifier of each of the one or more second wireless communication stations for which the multicast frame is intended is generated using one or more hash functions, and wherein the one or more hash functions are determined at least in part on the tolerable false positive rate.

In some embodiments, generating the hashed identifier further comprises: setting one or more bit locations of the bit map corresponding to the one or more hash functions to a first value.

In some embodiments, determining one or more second wireless communication stations identified within the predetermined proximity of the first wireless communication station for which the multicast frame is intended comprises: calculating a bit map length required for transmitting the multicast frame using one or more transmission modes to the one or more second wireless communication stations identified within the predetermined proximity of the first wireless communication station for which the multicast frame is intended; determining a transmission mode for transmitting the multicast frame based on a comparison of each of the calculated bit map lengths associated with using each of the one or more transmission modes; and wherein the multicast frame is transmitted using the determined transmission mode.

In some embodiments, a first wireless communication station for utilizing a dynamic indication map for multicast group and traffic indication is provided. The first wireless communication station comprises: a transceiver configured to transmit and receive wireless signals; an antenna coupled to the transceiver; one or more processors in communication with the transceiver; at least one memory that stores computer-executable instructions; and at least one processor of the one or more processors configured to access the at least one memory, wherein the at least one processor of the one or more processors is configured to execute the computer-executable instructions to: identify, at the first wireless communication station, one or more second wireless communication stations within a predetermined proximity of the first wireless communication station; determine, at the first wireless communication station, one or more second wireless communication stations identified within the predetermined proximity of the first wireless communication station for which a multicast frame is intended; generate, at the first wireless communication station, a bit map comprising a hashed identifier of each of the one or more second wireless communication stations for which the multicast frame is intended, wherein the bit map is included in the multicast frame; and cause to transmit, by the first wireless communication station, the multicast frame from the first wireless communication station to the one or more second wireless communication stations for which the multicast frame is intended.

In some embodiments, identifying one or more second wireless communication stations within a predetermined proximity of the first wireless communication station comprises: incrementing a counter when a second wireless communication device is determined to be within a predetermined distance from the first wireless communication station; and decrementing the counter when a predetermined time T lapses, wherein the predetermined time T is measured from an increment of the counter.

In some embodiments, determining one or more second wireless communication stations identified within the predetermined proximity of the first wireless communication station are to receive a multicast frame from the first wireless communication station comprises: determining a tolerable false positive rate based on determining a number of wireless communication stations for which the multicast frame is intended.

In some embodiments, the bit map defines a bit map length based at least in part on a determined number of the one or more second wireless communication stations for which the multicast frame is intended and the tolerable false positive rate.

In some embodiments, the hashed identifier of each of the one or more second wireless communication stations for which the multicast frame is intended is generated using one or more hash functions, and wherein the one or more hash functions are determined at least in part on the tolerable false positive rate.

In some embodiments, generating the hashed identifier further comprises: setting one or more bit locations of the bit map corresponding to the one or more hash functions to a first value.

In some embodiments, determining one or more second wireless communication stations identified within the predetermined proximity of the first wireless communication station for which the multicast frame is intended comprises: calculating a bit map length required for transmitting the multicast frame using one or more transmission modes to the one or more second wireless communication stations identified within the predetermined proximity of the first wireless communication station for which the multicast frame is intended; determining a transmission mode for transmitting the multicast frame based on a comparison of each of the calculated bit map lengths associated with using each of the one or more transmission modes; and wherein the multicast frame is transmitted using the determined transmission mode.

In some embodiments, a method for utilizing a dynamic indication map for multicast group and traffic indication is provided. The method comprises: identifying, by a computing device processor of a first wireless communication station, one or more second wireless communication stations within a predetermined proximity of the first wireless communication station; identifying, by the computing device processor of the first wireless communication station, one or more second wireless communication stations within a predetermined proximity of the first wireless communication station; determining, by the computing device processor of the first wireless communication station, one or more second wireless communication stations identified within the predetermined proximity of the first wireless communication station for which a multicast frame is intended; generating, by the computing device processor of the first wireless communication station, a bit map comprising a hashed identifier of each of the one or more second wireless communication stations for which the multicast frame is intended, wherein the bit map is included in the multicast frame; and causing to transmit, by the computing device processor of the first wireless communication station, the multicast frame from the first wireless communication station to the one or more second wireless communication stations for which the multicast frame is intended.

In some embodiments, identifying one or more second wireless communication stations within a predetermined proximity of the first wireless communication station comprises: incrementing, by the computing device processor of the first wireless communication station, a counter when a second wireless communication device is determined to be within a predetermined distance from the first wireless communication station; and decrementing, by the computing device processor of the first wireless communication station, the counter when a predetermined time T lapses, wherein the predetermined time T is measured from an increment of the counter.

In some embodiments, determining one or more second wireless communication stations identified within the predetermined proximity of the first wireless communication station are to receive a multicast frame from the first wireless communication station comprises: determining, by the computing device processor of the first wireless communication station, a tolerable false positive rate based on determining a number of wireless communication stations for which the multicast frame is intended.

In some embodiments, the bit map defines a bit map length based at least in part on a determined number of the one or more second wireless communication stations for which the multicast frame is intended and the tolerable false positive rate.

In some embodiments, the hashed identifier of each of the one or more second wireless communication stations for which the multicast frame is intended is generated using one or more hash functions, and wherein the one or more hash functions are determined at least in part on the tolerable false positive rate.

In some embodiments, generating the hashed identifier further comprises: setting, by the computing device processor of the first wireless communication station, one or more bit locations of the bit map corresponding to the one or more hash functions to a first value.

In some embodiments, determining one or more second wireless communication stations identified within the predetermined proximity of the first wireless communication station for which the multicast frame is intended comprises: calculating, by the computing device processor of the first wireless communication station, a bit map length required for transmitting the multicast frame using one or more transmission modes to the one or more second wireless communication stations identified within the predetermined proximity of the first wireless communication station for which the multicast frame is intended; determining, by the computing device processor of the first wireless communication station, a transmission mode for transmitting the multicast frame based on a comparison of each of the calculated bit map lengths associated with using each of the one or more transmission modes; and wherein the multicast frame is transmitted using the determined transmission mode.

In some embodiments, a system is provided for performing any of the methods disclosed herein.

In some embodiments, a system is provided for utilizing a dynamic indication map for multicast group and traffic indication. The system comprises: a first wireless communication station comprising an antenna; one or more second wireless communication stations comprising an antenna and communicatively coupled to the first wireless communication station via a communication channel; and wherein the first wireless communication station is configured to: identify, at the first wireless communication station, one or more second wireless communication stations within a predetermined proximity of the first wireless communication station; determine, at the first wireless communication station, one or more second wireless communication stations identified within the predetermined proximity of the first wireless communication station for which a multicast frame is intended; generate, at the first wireless communication station, a bit map comprising a hashed identifier of each of the one or more second wireless communication stations for which the multicast frame is intended, wherein the bit map is included in the multicast frame; and cause to transmit, by the first wireless communication station, the multicast frame from the first wireless communication station to the one or more second wireless communication stations for which the multicast frame is intended.

In some embodiments, an apparatus for utilizing a dynamic indication map for multicast group and traffic indication is provided. The apparatus comprises: means for identifying, at the first wireless communication station, one or more second wireless communication stations within a predetermined proximity of the first wireless communication station; means for determining, at the first wireless communication station, one or more second wireless communication stations identified within the predetermined proximity of the first wireless communication station for which a multicast frame is intended; means for generating, at the first wireless communication station, a bit map comprising a hashed identifier of each of the one or more second wireless communication stations for which the multicast frame is intended, wherein the bit map is included in the multicast frame; and means for transmitting, by the first wireless communication station, the multicast frame from the first wireless communication station to the one or more second wireless communication stations for which the multicast frame is intended.

In some embodiments, the means for identifying one or more second wireless communication stations within a predetermined proximity of the first wireless communication station comprises: means for incrementing a counter when a second wireless communication device is determined to be within a predetermined distance from the first wireless communication station; and means for decrementing the counter when a predetermined time T lapses, wherein the predetermined time T is measured from an increment of the counter.

In some embodiments, the means for determining one or more second wireless communication stations identified within the predetermined proximity of the first wireless communication station are to receive a multicast frame from the first wireless communication station comprises: means for determining a tolerable false positive rate based on determining a number of wireless communication stations for which the multicast frame is intended.

In some embodiments, the bit map defines a bit map length based at least in part on a determined number of the one or more second wireless communication stations for which the multicast frame is intended and the tolerable false positive rate.

In some embodiments, the hashed identifier of each of the one or more second wireless communication stations for which the multicast frame is intended is generated using one or more hash functions, and wherein the one or more hash functions are determined at least in part on the tolerable false positive rate.

In some embodiments, generating the hashed identifier further comprises: setting one or more bit locations of the bit map corresponding to the one or more hash functions to a first value In some embodiments, the means for determining one or more second wireless communication stations identified within the predetermined proximity of the first wireless communication station are to receive a multicast frame from the first wireless communication station comprises: means for calculating a bit map length required for transmitting the multicast frame using one or more transmission modes to the one or more second wireless communication stations identified within the predetermined proximity of the first wireless communication station for which the multicast frame is intended; means for determining a transmission mode for transmitting the multicast frame based on a comparison of each of the calculated bit map lengths associated with using each of the one or more transmission modes; and wherein the multicast frame is transmitted using the determined transmission mode.

What is claimed is:

1. A non-transitory computer readable medium including instructions stored thereon, which when executed by one or more processor(s) of a first wireless communication station, cause the device to perform operations of:
   identifying, at the first wireless communication station, one or more second wireless communication stations within a predetermined proximity of the first wireless communication station;
   determining, at the first wireless communication station, one or more, of the one or more, second wireless communication stations identified within the predetermined proximity of the first wireless communication station for which a multicast frame is intended;
   generating, at the first wireless communication station, a bit map comprising a hashed identifier of each of the one or more, of the one or more, second wireless communication stations for which the multicast frame is intended, wherein:
      the bit map is included in the multicast frame, and
      the hashed identifier of each of the one or more, of the one or more, second wireless communication stations maps a respective media access control (MAC) address for each of the one or more, of the one or more, second wireless communication stations to a location on the bit map corresponding to each of the one or more, of the one or more, second wireless communication stations; and
   causing to transmit, by the first wireless communication station, the multicast frame from the first wireless communication station to the one or more, of the one or more, second wireless communication stations for which the multicast frame is intended.

2. The non-transitory computer readable medium of claim 1, wherein identifying the one or more second wireless communication stations within a predetermined proximity of the first wireless communication station comprises:
   incrementing a counter when a second wireless communication device, of the one or more second wireless communication stations, is determined to be within a predetermined distance from the first wireless communication station; and
   decrementing the counter when a predetermined time T lapses, wherein the predetermined time T is measured from an increment of the counter.

3. The non-transitory computer readable medium of claim 1, wherein determining the one or more, of the one or more, second wireless communication stations identified within the predetermined proximity of the first wireless communication station are to receive a multicast frame from the first wireless communication station comprises:
   determining a tolerable false positive rate based on determining a number of wireless communication stations for which the multicast frame is intended.

4. The non-transitory computer readable medium of claim 3, wherein the bit map defines a bit map length based at least in part on a determined number of the one or more second wireless communication stations for which the multicast frame is intended and the tolerable false positive rate.

5. The non-transitory computer readable medium of claim 3, wherein the hashed identifier of each of the one or more, of the one or more, second wireless communication stations for which the multicast frame is intended is generated using one or more hash functions, and wherein the one or more hash functions are determined at least in part on the tolerable false positive rate.

6. The non-transitory computer readable medium of claim 5, wherein generating the hashed identifier further comprises:
setting one or more bit locations of the bit map corresponding to the one or more hash functions to a first value.

7. The non-transitory computer readable medium of claim 1, wherein determining the one or more of the one or more second wireless communication stations identified within the predetermined proximity of the first wireless communication station for which the multicast frame is intended comprises:
calculating a bit map length required for transmitting the multicast frame using one or more transmission modes to the one or more, of the one or more second wireless communication stations identified within the predetermined proximity of the first wireless communication station for which the multicast frame is intended;
determining a transmission mode for transmitting the multicast frame based on a comparison of each of the calculated bit map lengths associated with using each of the one or more transmission modes; and
wherein the multicast frame is transmitted using the determined transmission mode.

8. A first wireless communication station, comprising:
a transceiver configured to transmit and receive wireless signals;
an antenna coupled to the transceiver;
one or more processors in communication with the transceiver;
at least one memory that stores computer-executable instructions; and
at least one processor of the one or more processors configured to access the at least one memory, wherein the at least one processor of the one or more processors is configured to execute the computer-executable instructions to:
identify, at the first wireless communication station, one or more second wireless communication stations within a predetermined proximity of the first wireless communication station;
determine, at the first wireless communication station, one or more, of the one or more, second wireless communication stations identified within the predetermined proximity of the first wireless communication station for which a multicast frame is intended;
generate, at the first wireless communication station, a bit map comprising a hashed identifier of each of the one or more, of the one or more, second wireless communication stations for which the multicast frame is intended, wherein:
the bit map is included in the multicast frame, and
the hashed identifier of each of the one or more second wireless communication stations maps a respective media access control (MAC) address for each of the one or more, of the one or more, second wireless communication stations to a location on the bit map corresponding to each of the one or more, of the one or more, second wireless communication stations; and cause to transmit, by the first wireless communication station, the multicast frame from the first wireless communication station to the one or more, of the one or more, second wireless communication stations for which the multicast frame is intended.

9. The first wireless communication station of claim 8, wherein identifying one or more second wireless communication stations within a predetermined proximity of the first wireless communication station comprises:
incrementing a counter when a second wireless communication device, of the one or more second wireless communication stations, is determined to be within a predetermined distance from the first wireless communication station; and
decrementing the counter when a predetermined time T lapses, wherein the predetermined time T is measured from an increment of the counter.

10. The first wireless communication station of claim 8, wherein determining the one or more, of the one or more, second wireless communication stations identified within the predetermined proximity of the first wireless communication station are to receive a multicast frame from the first wireless communication station comprises:
determining a tolerable false positive rate based on determining a number of wireless communication stations for which the multicast frame is intended.

11. The first wireless communication station of claim 10, wherein the bit map defines a bit map length based at least in part on a determined number of the one or more second wireless communication stations for which the multicast frame is intended and the tolerable false positive rate.

12. The first wireless communication station of claim 10, wherein the hashed identifier of each of the one or more, of the one or more, second wireless communication stations for which the multicast frame is intended is generated using one or more hash functions, and wherein the one or more hash functions are determined at least in part on the tolerable false positive rate.

13. The first wireless communication station of claim 12, wherein generating the hashed identifier further comprises:
setting one or more bit locations of the bit map corresponding to the one or more hash functions to a first value.

14. The first wireless communication station of claim 8, wherein determining the one or more of the one or more second wireless communication stations identified within the predetermined proximity of the first wireless communication station for which the multicast frame is intended comprises:
calculating a bit map length required for transmitting the multicast frame using one or more transmission modes to the one or more, of the one or more second wireless communication stations identified within the predetermined proximity of the first wireless communication station for which the multicast frame is intended;
determining a transmission mode for transmitting the multicast frame based on a comparison of each of the calculated bit map lengths associated with using each of the one or more transmission modes; and
wherein the multicast frame is transmitted using the determined transmission mode.

15. A method comprising:
identifying, by a computing device processor of a first wireless communication station, one or more second wireless communication stations within a predetermined proximity of the first wireless communication station;

identifying, by the computing device processor of the first wireless communication station, one or more second wireless communication stations within a predetermined proximity of the first wireless communication station;

determining, by the computing device processor of the first wireless communication station, one or more, of the one or more, second wireless communication stations identified within the predetermined proximity of the first wireless communication station for which a multicast frame is intended;

generating, by the computing device processor of the first wireless communication station, a bit map comprising a hashed identifier of each of the one or more, of the one or more, second wireless communication stations for which the multicast frame is intended, wherein:
the bit map is included in the multicast frame, and
the hashed identifier of each of the one or more, of the one or more, second wireless communication stations maps a respective media access control (MAC) address for each of the one or more, of the one or more, second wireless communication stations to a location on the bit map corresponding to each of the one or more, of the one or more, second wireless communication stations; and causing to transmit, by the computing device processor of the first wireless communication station, the multicast frame from the first wireless communication station to the one or more, of the one or more, second wireless communication stations for which the multicast frame is intended.

16. The method of claim 15, wherein identifying one or more second wireless communication stations within a predetermined proximity of the first wireless communication station comprises:

incrementing, by the computing device processor of the first wireless communication station, a counter when a second wireless communication device of the one or more second wireless communication stations, is determined to be within a predetermined distance from the first wireless communication station; and decrementing, by the computing device processor of the first wireless communication station, the counter when a predetermined time T lapses, wherein the predetermined time T is measured from an increment of the counter.

17. The method of claim 15, wherein determining the one or more, fo the one or more, second wireless communication stations identified within the predetermined proximity of the first wireless communication station are to receive a multicast frame from the first wireless communication station comprises:

determining, by the computing device processor of the first wireless communication station, a tolerable false positive rate based on determining a number of wireless communication stations for which the multicast frame is intended.

18. The method of claim 17, wherein the bit map defines a bit map length based at least in part on a determined number of the one or more second wireless communication stations for which the multicast frame is intended and the tolerable false positive rate.

19. The method of claim 17, wherein the hashed identifier of each of the one or more, of the one or more, second wireless communication stations for which the multicast frame is intended is generated using one or more hash functions, and wherein the one or more hash functions are determined at least in part on the tolerable false positive rate.

20. The method of claim 19, wherein generating the hashed identifier further comprises:

setting, by the computing device processor of the first wireless communication station, one or more bit locations of the bit map corresponding to the one or more hash functions to a first value.

* * * * *